United States Patent [19]

Hosoe et al.

[11] 4,257,705
[45] Mar. 24, 1981

[54] DEVICE FOR FOCUS DETECTION OR DISTANCE DETECTION

[75] Inventors: Kazuya Hosoe, Machida; Yukichi Niwa, Yokohama; Tokuichi Tsunekawa, Yokohama; Mitsutoshi Owada, Yokohama; Noriyuki Asano, Kawasaki; Makoto Masunaga, Tokyo, all of Japan

[73] Assignee: Canon Kabushiki Kaisha, Tokyo, Japan

[21] Appl. No.: 22,368

[22] Filed: Mar. 20, 1979

[30] Foreign Application Priority Data

Mar. 23, 1978 [JP] Japan ................... 53-33476

[51] Int. Cl.³ .......... G01C 3/00; G01C 5/00; G03B 7/08
[52] U.S. Cl. ..................... 356/1; 250/201; 354/25; 356/4
[58] Field of Search .......... 356/1, 4; 354/25; 250/201

[56] References Cited

U.S. PATENT DOCUMENTS

| 3,435,744 | 4/1969 | Stimson | 356/1 |
| 3,679,307 | 7/1972 | Zoot et al. | 356/4 |
| 3,898,676 | 8/1975 | Hosoe | 354/25 |
| 4,002,899 | 1/1977 | Stauffer | 250/201 |
| 4,004,852 | 1/1977 | Pentecost | 356/1 |
| 4,078,171 | 3/1978 | Stauffer | 354/25 |
| 4,135,815 | 1/1979 | Masunaga et al. | 356/1 |

FOREIGN PATENT DOCUMENTS 52-55658  5/1977  Japan ................... 356/1

Primary Examiner—Stephen C. Buczinski
Attorney, Agent, or Firm—Fitzpatrick, Cella, Harper & Scinto

[57] ABSTRACT

This invention relates to a device for focus detection or distance detection in which one or more images of a target formed by an optical system are received by photoelectric light receiving means to obtain a photoelectric output regarding the imaging condition of the image of the target and this photoelectric output is electrically processed through a processing circuit to thereby provide an electrical output representing the focus adjusted condition of the optical system with respect to the target or the distance to the target. According to the improvements of the present invention, such device is provided with projector means for illuminating a limited part of the detection view field determined by the focal length of the optical system and the dimensions of the effective light receiving surface of the photoelectric light receiving means, detection means for detecting whether or not the signal put out by the photoelectric light receiving means regarding the imaging condition of one or more images of the target is a sufficiently proper signal to ensure accurate focus detection or distance detection by the processing circuit, and control means for controlling the projector means in accordance with the detection output from the detection means. When proper detection is not ensured during the focus detection or the distance detection, the projector means is driven by the control means in accordance with the detection output of the detection means and the projection image of the projected light formed thereby on the target is utilized to effect focus detection or distance detection.

14 Claims, 27 Drawing Figures

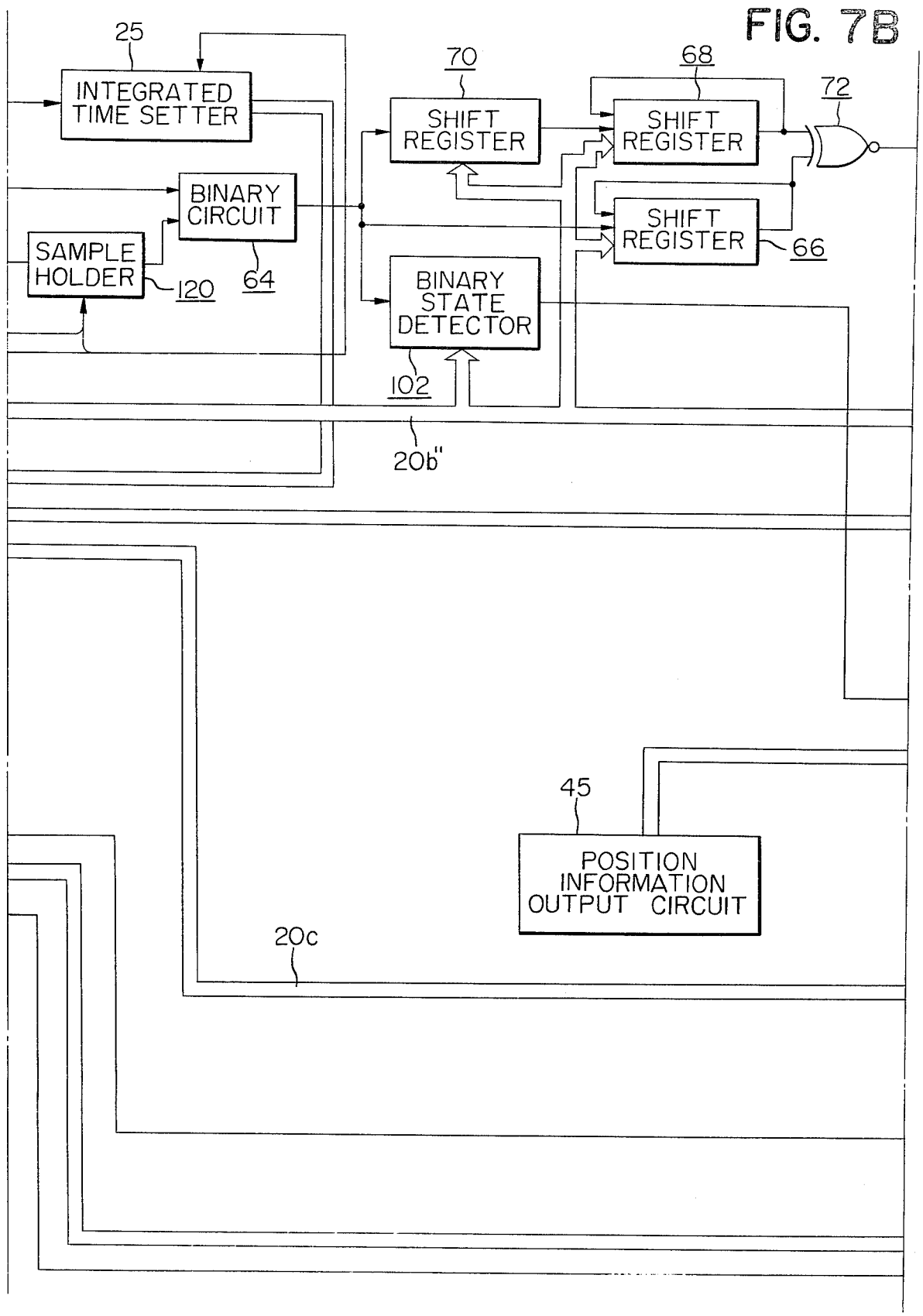

| STATE<br>OUTPUT TERMINAL | PROPER OPERATING STATE | | | FIRST STAGE OR ABNORMAL STATE | |
|---|---|---|---|---|---|
| | BACKWARD FOCUSSING<br>A < B | FOCUSSING<br>A = B | FORWARD FOCUSSING<br>A > B | NOT ∞ | ∞ |
| OT1 | H | L | L | L | L |
| OT2 | L | L | H | H | L |
| OT3 | H | H | L | L | H |
| OT4 | L | H | H | H | H |
| ALM | L | | | H | |

DEVICE FOR FOCUS DETECTION OR DISTANCE DETECTION

BACKGROUND OF THE INVENTION

1. Field of the Invention

This invention relates to improvements in a device for focus detection or distance detection in which one or more images of a target formed by an optical system are received by photoelectric light receiving means to obtain a photoelectric output regarding the imaging condition of the image of the target and this photoelectric output is electrically processed through a processing circuit to thereby provide an electrical output representing the focus adjusted condition of the optical system with respect to the target or the distance to the target.

2. Description of the Prior Art

There have heretofore been proposed numerous devices which are adapted to photoelectrically detect the focus adjusted condition of an optical system with respect to an object or the distance to the object. As the principle of focus detection in such devices, there has often been adopted a method in which a photoelectric light receptor is disposed in a predetermined image formation plane of a picture-taking optical system or a detection optical system operatively associated with the picture-taking optical system so that the degree of clearness of the image of an object is detected by the photoelectric output of the photoelectric light receptor to thereby know the focus adjusted condition of the picture-taking optical system with respect to the object; or a method whereby the degree of deviation between two upper and lower split images formed by a split image optical system is detected by the output of a photoelectric light receptor to thereby know the focus adjusted condition of the picture-taking optical system with respect to an object; or a method in which the measuring optical system is designed as a so-called base line range finder type optical system and a part thereof is operatively associated with the picture-taking optical system, whereby two images of an object are formed with an amount of relative deviation corresponding to the deviation of the adjusted position of the picture-taking optical system with respect to the distance to the object and the amount of relative deviation between the two images is detected on the basis of the output of the photoelectric light receptor to thereby know the focus adjusted condition of the picture-taking optical system with respect to the object. On the other hand, as the principle of distance detection, there has often been adopted a method whereby two images of an object are formed by a fixedly disposed base line range finder type optical system with an amount of relative positional deviation corresponding to the distance to the object and the amount of relative deviation between the two images is detected on the basis of the photoelectric output from a photoelectric light receptor to thereby know the distance to the object; or a method in which a part of the aforementioned optical system is made movable to enable one image to be arbitrarily moved relative to the other image and the point whereat the amount of relative deviation between the two images is eliminated is detected by the output of the photoelectric light receptor to thereby know the distance to the object from the position of the movable part of the optical system at said point.

In any case, such devices are very often utilized as the automatic focus detection devices or further as the automatic focus adjusting devices, in optical instruments such as cameras or the like and in such case, the detecting operation thereof must be sufficiently ensured even for objects of very low brightness, with the area to be photographed by the camera or the like being taken into consideration.

On the other hand, however, the light sensing portion of the photoelectric light receptor is often formed of Si(silicon) or CdS(cadmium sulfide) or like material and accordingly, the detectable brightness level is naturally limited by the conditions determined by the physical properties of these materials and when the noise signals or the like generated by the subsequent processing electrical circuit are taken into account, the substantial limit of detection is usually further narrowed.

In view of such inconveniences, according to, for example, U.S. Pat. No. 3,813,679 (granted to Hasegawa et al. for an invention entitled "FOCUS DETECTOR DEVICE" assigned to Canon K.K.), U.S. Pat. No. 4,002,899 (granted to Stauffer for an invention entitled "FOCUS DETECTING APPARATUS") or Japanese Laid-Opened Patent Application No. 55658/1977 (entitled "DISTANCE DETECTING DEVICE"), there have been proposed some types of device in which an illumination source for additionally illuminating an object is provided so that when the brightness of the object is low, the object may be illuminated automatically or by manual operation to thereby enable the detection with respect to the object of low brightness. However, in these proposals, an object is uniformly illuminated by an illumination source and therefore, much light energy is projected to other than the view field to be actually detected and accordingly, the power consumption required for driving the illumination source is unnecessarily increased to cause a great loss of the power source, and in addition, however high brightness of illumination is effected for an object of uniform brightness, namely, an object of very little contrast, the brightness level of the entire object is only increased and only uniform light is received by the photoelectric light receptor and thus, for such an object, it is impossible in principle to achieve focus detection or distance detection even if an additional illumination is provided.

SUMMARY OF THE INVENTION

The present invention has been made in view of the above-noted situations and has for its primary object to eliminate all the inconveniences peculiar to the heretofore proposed devices of the type which photoelectrically effects focus detection or distance detection and to provide a more advantageous and excellent form of focus detection or distance detection device which does not suffer from unnecessary loss of the power source during the driving of the additional illumination source and yet sufficiently ensures focus detection or distance detection even for an object of uniform brightness and in which the drive control of the illumination source is antomatically achieved on the basis of whether or not the signal put out by the photoelectric light receiving means regarding the imaging condition of one or more images of the object is a sufficiently proper signal to ensure accurate focus detection or distance detection by a signal processing circuit.

For such an object, according to the present invention, there is proposed a more advantageous and novel form of the device for focus detection or distance detection in which one or more images of a target formed by the optical system are received by photoelectric light receiving means to obtain a photoelectric output regarding the imaging condition of the image of the target and the photoelectric output is electrically processed through a processing circuit, whereby an electrical output repressenting the focus adjusted condition of the optical system with respect to the target or the distance to the target is provided and which is provided with projector means for illuminating a limited part of the detection view field determined by the focal length of the optical system and the dimensions of the effective light receiving surface of the photoelectric light receiving means, detection means for detecting whether or not the signal put out by the photoelectric light receiving means regarding the imaging condition of one or more images of the target is a sufficiently proper signal to ensure accurate focus detection or distance detection by the processing circuit, and control means for controlling the projector means in accordance with the detection output from the detection means, whereby when proper detection is not ensured during focus detection or distance detection, the projector means is driven by the control means in accordance with the detection output of the detection means and the projection image of the projected light formed thereby on the target is utilized to effect focus detection or distance detection.

According to this, only a part of the detection view field is illuminated and this not only leads to a greatly reduced power consumption required for the driving of the projector means but also leads to the provision of an effect equivalent to that of a clear target, namely, a clear contrast, artificially created in the detection view field and accordingly, it is readily possible to effect focus detection or distance detection even for objects of uniform brightness. Particularly, the present invention is also advantageous in that the drive control of the projector means is not only effected by detecting the brightness level of the object but also automatically achieved on the basis of the result of the detection as to whether or not the signal put out by the photoelectric light receiving means regarding the imaging condition of one or more images of the object is a sufficiently proper signal to ensure accurate focus detection or distance detection by the signal processing circuit.

It is another object of the present invention to provide improvements over the device already proposed by the inventors in U.S. patent application Ser. No. 944,974, filed Sept. 22, 1978, entitled "RANGE FINDING DEVICE" (German Application No. P 28 42 348.5, filed Sept. 28, 1978, entitled "Entfernungsmessvorrichtung"). In this copending application, the inventors proposed, as a range finding device in which, with respect to an object whose distance is to be detected, images of first and second view fields following different lines of vision containing the object and having different ranges are scanned to obtain M successive quantized (binarized) image element data on the image of the first view field and N (N>M) successive quantized image element data on the image of the second view field and these M and N quantized image element date are stored in shift registers, respectively, whereafter, among the N quantized image element data on the image of the second view field, different sets of M successive quantized image element data are compared with the M successive quantized image element data on the image of the first view field, to thereby detect the portion of the second field image which is most similar to the first field image and know the distance to the object from the position of such most similar image portion in the second field image (such device is also proposed in U.S. Pat. No. 4,004,852, granted to Eugene E. Pentecost for an invention entitled "INTEGRATED AUTOMATIC RANGE FINDING DEVICE FOR AN OPTICAL INSTRUMENT"), a form of device as shown in the embodiment of FIG. 32 thereof wherein, for an object of low contrast or low brightness, projector means provided on the device side is actuated to project a very much limited light beam to the object to form a light spot on the object so that range finding may be effected with such light spot as a mark, and the present invention further intends to provide a more rational and advantageous form of automatic drive control for such projector means.

For such an object, according to a preferred embodiment of the present invention, as an improvement over the device of the aforementioned copending application, there is proposed a more advantageous form of device in which the drive control of the projector means may be automatically achieved on the basis of whether or not the quantized image element data at least on the aforementioned first field image is proper data for effecting the range finding, or more specifically, on the basis of whether or not the quantized image element data at least on the first field image, preferably, the quantized image element data on the first and second field images, are all one and the same value (for example, all "1" or all "0", or on the basis of whether or not the degree of "similarity", to the first field image, of the image portion of the second field image which has been deemed to be most similar to the first field image as the result of the above-mentioned data comparison is above the allowable lower limit degree. That is, improper quantization of the image element data or reduction in the degree of "similarity" is a phenomenon which remarkably appears when the contrast of the object is low and in such a case, the range finding can hardly take place or, if it can, the distance result obtained is very poor in reliability, but according to the form of device mentioned above, the fear of such inconvenience may be completely eliminated and in this point, such a form of device is very rational and advantageous. Incidentally, in the embodiment of FIG. 32 of the aforementioned copending application, the inventors have disclosed that where use is made of an image sensor such as photo-diode array (MOS Image-Sensor), CCD (Charge Coupled Device) or BBD (Bucket Brigade Device) or the like, the projector means may be automatically actuated, for example, when there is no allowance on the longer time side of the integration time of the image signal to be set to the image sensor, namely, when a sufficient scanning signal is not provided even by the longest integration time, and adoption of the construction proposed by the aforementioned embodiment of the present invention, together with the foregoing disclosure, will provide a perfect device of this type.

It is still another object of the present invention to provide a counter measure for a situation in which, where the device of the described type is applied to an automatic focus detection or an automatic focus adjusting device in an optical instrument such as camera or the like, proper detection will not be ensured even by actuating the projector means to effect the detection.

For such an object, according to a preferred embodiment of the present invention, there is proposed a form of device in which the optical system is adjusted to the infinity focus position when proper detection is not ensured even by actuating the projector means to effect the detection, and this in itself will be more rational and advantageous. That is, proper detection being not ensured even by actuating the projector means signifies that a clear mark is not formed on an object even by actuating the projector means, and in most cases, this is likely to occur when the object is at a relatively great distance and the intensity of the projected light from the projector means is extremely reduced. Therefore, from such a point of view, by making such a design that the optical system is adjusted to the infinity focus position when proper detection is not ensured even by actuating the projector means, as described above, it would be possible to obtain a substantially permissible degree of focused condition in most cases.

Other objects and features of the present invention will become fully apparent from the ensuing description taken in conjunction with the accompanying drawings.

BRIEF DESCRIPTION OF THE DRAWINGS

Preferred embodiments of the present invention will hereinafter be described by reference to the accompanying drawings, in which.

DESCRIPTION OF THE PREFERRED EMBODIMENTS

Figure 1:
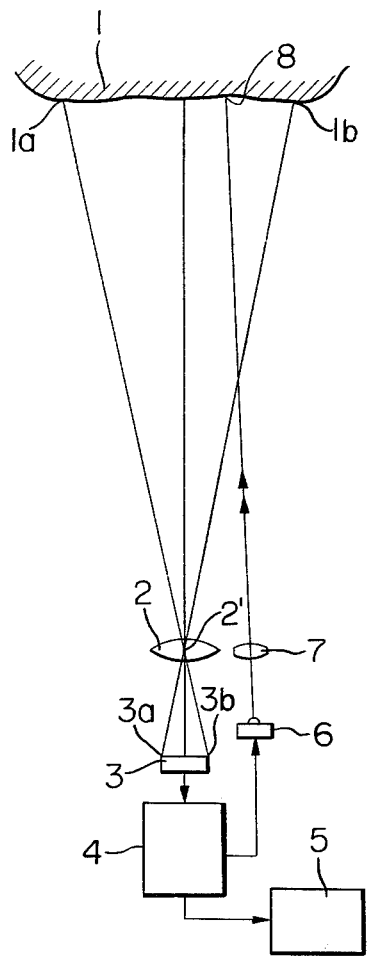
FIG. 1 is a schematic view showing the basic construction of a focus detection or distance detection device provided with locally illuminating projector means according to the present invention.

Referring first to FIG. 1, reference numeral 1 designates an object whose distance or focus is to be detected. Designated by 2 is an image forming lens for forming an image of the object 1 on a photoelectric light receptor 3. In such an arrangement and construction, it is apparent that the image information within the range defined by the points of intersection 1a and 1b between the straight lines passing through the opposite ends 3a, 3b of the effective light receiving area of the photoelectric light receptor 3 and the center 2' of the image forming lens 2 and the object 1, is processed for the range finding or the focus detection of the object 1. Thus, the area between said points 1a and 1b is called the detection view field. The photoelectric output provided by the image of the object 1 within such detection view field being formed on the photoelectric light receptor 3 is directed to an electric circuit 4, where the photoelectric output is subjected to signal processing for the range finding or for the focus detection. The output of the electric circuit corresponds to the distance of the object 1 or the clearness of the image of the object 1 and is directed to display means 5. In the display means 5, the distance of the object 1 or the imaging condition of the object on the photoelectric light receptor 3 is indicated by a meter needle or as a numerical value. Apparently, the output of the electric circuit may also be used for the automatic focus adjustment of a picture-taking optical system in a camera or the like by connecting thereto an unshown control system. Designated by 6 is a projector means provided according to the present invention which may comprise, for example, a light-emitting diode having a high brightness of emitted light and a minute area of light emission of a similar laser diode. The light emitted from the projector means 6 is converged substantially to infinity, for example, by a condensing optical system 7 and is contemplated so as to form as small a light spot 8 as possible on an object at any desired distance.

The projector means 6 is driven by the control output from the electric circuit 4, and the driving conditions and the driving system thereof will hereinafter be described in detail.

Figure 2:
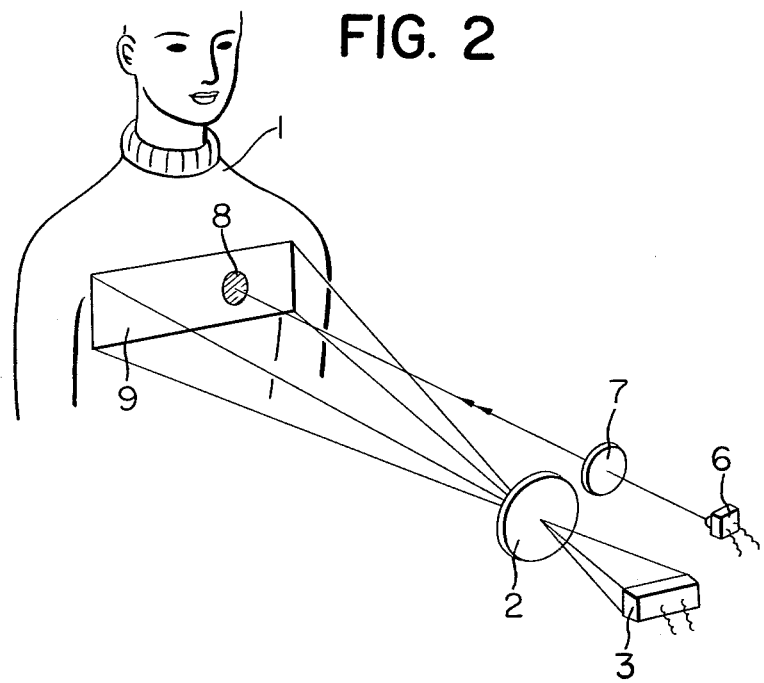
FIG. 2 is a schema for illustrating the principle of focus detection or distance detection utilizing the projector means in the device of FIG. 1.

FIG. 2 shows the state in which the object 1 is locally illuminated by the projector 6 and in FIG. 2, the components indicated by reference characters identical to those in FIG. 1 are similar to those already described and need not be described. In FIG. 2, reference numeral 9 designates the detection view field for the range finding or the focus detection defined on the object 1 as already described, and reference numeral 8 designates the illuminating light spot formed within the detection view field 9, namely, the projected image of the projected light. In FIG. 2, there is shown an example in which the object 1 is a human figure and the detection view field 9 lies in a plain surface. In such a case, no contrast of the object is present within the detection view field 9 and therefore, the range finding or the focus detection is impossible, but if the projected image 8 of the projected light is formed, there is the same effect as that when a clear contrast is present within the detection view field 9, thereby enabling the focus detection or the range finding.

By so using the projector means 6, the focus detection or the range finding becomes possible even in a surface of uniform brightness and the operable range of the photoelectric focus detecting or distance detecting device may be expanded. As regards the wavelength spectrum of the light emitted from the projector means 6, it should desirably be invisible near-infrared light but it may have a dark red spectrum of the order of 7000 Å. Also, during the picture-taking, it is apparently inconvenient to effect visible light illumination and sensitize the film by such illuminating light and therefore, it is preferable to use the above-described invisible light but it visible light is used the point of time whereat the focus detection or the distance detection occurs and the point of time whereat the picture-taking occurs should better be separated from each other. It is also possible to use a visible light intercepting filter.

Incidentally, where the photoelectric light receptor 3 comprises silicon photosensitive elements, the projector means 6 may be a light emitting means of a long wavelength range having a projection spectrum coincident with the wavelength range to which the silicon photosensitive elements are well responsive, for example, a near-infrared or infrared light emitting diode or a laser diode or the like.

The range finding device already proposed by the inventors in U.S. application Ser. No. 944,974 (German counterpart No. P 28 42 348.5) will now be described as an application of the improvements of the present invention of which the outline has been described hitherto.

Figure 3:
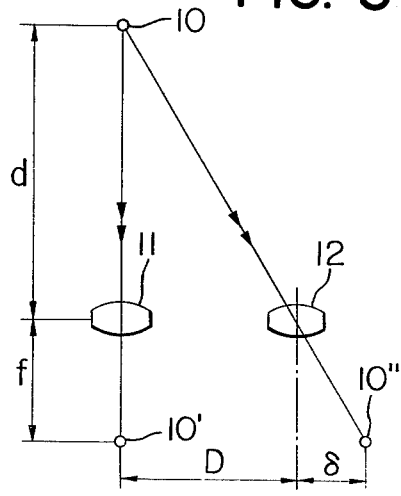
FIG. 3 is a schema for illustrating the range finding principle in the range finding device proposed in the aforementioned U.S. application Ser. No. 944,974 (German counterpart No. P 28 42 348.5) to which the improvement of the present invention is applied.

FIG. 3 illustrates the principle of the range finding in such range finding device. In FIG. 3, reference numeral 10 designates an object whose distance is to be measured, and reference numerals 11 and 12 denote two image forming lenses in a range finding optical system having the function of forming the images 10' and 10" of the object 10 on the focal plane thereof. These lenses 11 and 12 are spatially spaced apart from each other by D.

As shown, the object 10 is disposed so that it lies on the optical axis of the lens 11 and if the distance from the lens 11 to the object 10 is d and the focal length of the lenses 11 and 12 are f, it is apparent from FIG. 3 that the amount of deviation δ of the object image 10" formed by the lens 12 from the optical axis of the lens 12 is given by $$\delta = fD/d \tag{1}$$

As is apparent from equation (1), δ includes the object distance d and therefore, the object distance may be known by knowing the mutual positions of the two images 10' and 10".

Figure 4:
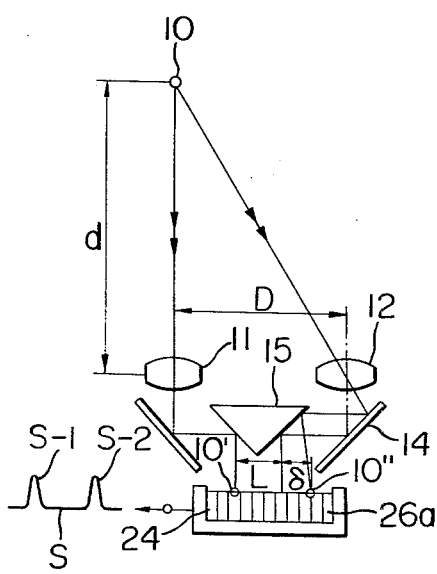
FIG. 4 is a schema showing the arrangement and construction of the range finding optical system and image sensor in the above-mentioned range finding device.

FIG. 4 illustrates the arrangement and construction of the range finding optical system and image sensor in the range finding device of U.S. application Ser. No. 944,974 (German counterpart No. P 28 42 348.5) for effecting the range finding on the basis of the range finding principle described in connection with FIG. 3. In FIG. 4, the components designated by reference numerals used in FIG. 3 are identical to those in FIG. 3. Here, as the range finding optical system, total reflection mirrors 13 and 14 are disposed rearwardly of the lenses 11 and 12 so that the incoming light beams passed through the lenses 11 and 12 are inwardly deflected. Designated by 15 is a total reflection prism having total reflection surfaces disposed at right angles with each other so as to deflect the said two beams downwardly. In this manner, the images of the object 10 are formed on the focal planes of the lenses 11 and 12, and here the relative position of the two images 10' and 10" is more minute than that shown in FIG. 3. Denoted by 24 is a self-scanning type image sensor disposed near to the imaged planes of the two images 10' and 10" and having, for example, the integration effect of CCD or the like, and the light receiving portion of the image sensor 24 comprises a number of minute segment light receiving elements 26a each having a width of the order of 15μ, for example.

As is well-known, the self-scanning type image sensor has the function of putting out, as time series signals, electrical signals corresponding to the illuminations on the image element portions of the object image detected by the number of minute segment light receiving elements 26a, in a predetermined sequence. Since it is only required here to detect the amount of lateral relative deviation of the two images 10' and 10", the image sensor used is a linear image sensor in which the light receiving elements 26a are arrayed in a row as shown. Also, here, the scanning output regarding the two images 10' and 10" is taken out with the waveform as shown by S in FIG. 4 and therefore, the interval between the signals S-1 and S-2 corresponding to the two signals in the scanning output is detected by an electrical signal processing circuit to thereby effect the measurement of the object distance.

Now, in the range finding device described herein, it is intended to detect the interval between two images by the use of a self-scanning type linear image sensor (hereinafter simply referred to as the line sensor) on the basis of the distance measuring principle described above, but in such a range finding device it is necessary to make clear the space of the object whose distance is to be measured, in other words, to define the measuring view field by any means and at the same time, to define a view field which catches another image (this latter view field will hereinafter be referred to as a reference view field). In the device described herein, the measuring view field, namely, the standard view field, is set near the imaged position of the image 10' shown in FIG. 4, whereas the reference view field is set by taking into account the range over which the image 10" is moved in accordance with the distance of the object 10.

Figure 5A:
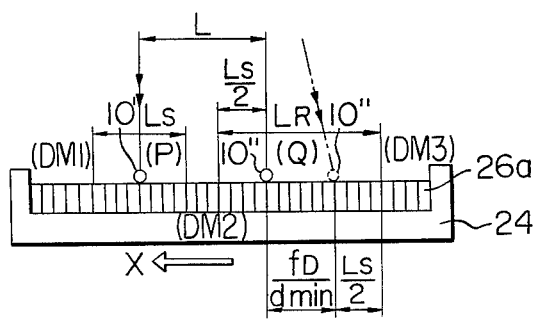
FIGS. 5A, 5B, 5C and 5D are schema showing the relation between the standard field and the reference field determined on the image sensor of FIG. 4 and the output of the image sensor as well as the quantized image signal obtained in the subsequent processing circuit.

Therefore, if the horizontal length of the standard view field is $L_S$ as shown in FIG. 5A, the length $L_R$ of the reference view field in given as:

$$L_R = L_S + (f \cdot D/[d(min.)]) \tag{2}$$

where d(min) is the shortest distance of the object which is measurable by this device. That is, in FIG. 5A, when the object 10 is at infinity, the image 10" exists at the position indicated by the solid line in the drawing and the then mutual distance to the image 10' is L, but the position of the image 10" when the object 10 is at the shortest distance d(min) is displaced to the position indicated by broken line in the drawing, and the amount of displacement from the imaged position for infinity is given by fD/d(min). Therefore, the reference view field must be defined into a relation given by equation (2) in order that the same image portion as the image of the standard view field may exist within the reference view field at any object distance.

Figure 5B:
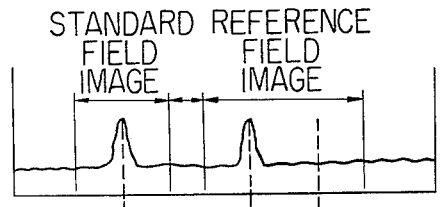

Thus, if the direction in which the output of the line sensor 24 is read is made to be the direction of arrow X in FIG. 5A and if the pitch of the light receiving elements 26a is $\epsilon$, and assuming that the group DM1 of left end n light receiving elements is a dummy area, then a signal regarding the standard field image may be obtained from the group P of n+1st to n+LS/$\epsilon$th light receiving elements. Next, assuming that the group DM2 of n+LS/$\epsilon$+1st to n+L/$\epsilon$th light receiving elements is the area for separating the standard field image from the reference field image, a signal regarding the reference view field image may be obtained from the group Q of n+L/$\epsilon$+1st to n+(L+LS+fD/dmin)/$\epsilon$th light receiving elements. The last n' light receiving element group DM3 is a dummy area. Thus, the standard field and the reference field may be electrically preset and during the processing of the image scanning signal, this may be utilized to take out the standard field image signal and the reference field image signal from the output of the line sensor 24. Incidentally, in the device of U.S. application Ser. No. 944,974 (German counterpart No. P28 42 348.5), a sensor having 512 light receiving elements, namely, a sensor of 512-bit construction, is used as the line sensor 24 and 106, 64, 132, 144 and 66 light receiving elements are respectively allotted to the aforementioned areas DM1, P, DM2, Q and DM3. FIG. 5B shows a model of each of the standard field image signal and the reference field image signal obtained under the above-described setting.

Figure 5C:
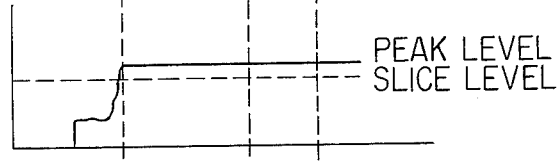
Figure 5D:
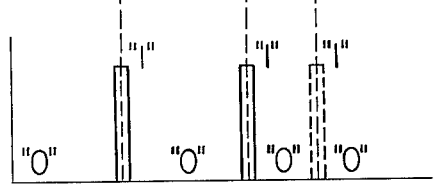

In the range finding device described herein, it is intended to effect the distance measurement by detecting in which area of the reference field image the same image portion as the standard field image exists, in accordance with the image signal obtained in the above-described manner, and this is digitally effected. More specifically, during the first scanning, the peak level of the standard field image signal is detected as conceptionally shown in FIG. 5C and by multiplying the obtained peak level by a number less than 1, for example, 0.8, the slice level is determined which provides the standard for binarizing (namely, quantizing) the scanning image element signal obtained in the next scanning and by comparing the scanning image element signal obtained in said next scanning with said slice level, a binary image element data "0" or "1" is obtained as shown in FIG. 5D, and by detecting in which area of the reference field image the image portion most similar to the standard field image exists, in accordance with the said binary image element data, the distance measurement may be accomplished.

Figure 6:
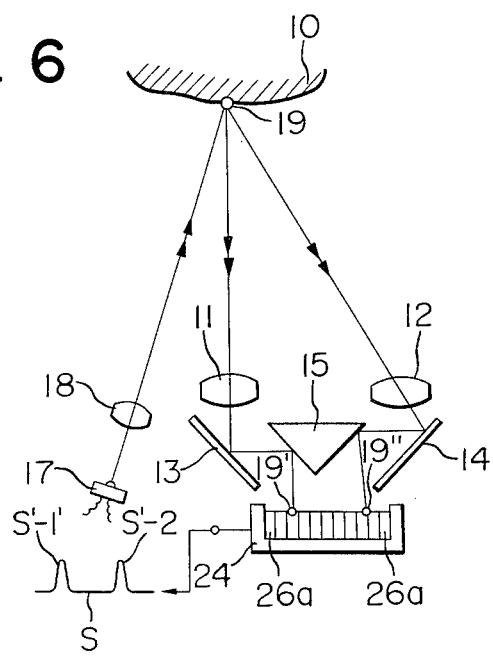
FIG. 6 is a schema for illustrating the rangefinding principle utilizing the projector means where the locally illuminating projector means is added to the range finding device according to the improvement of the present invention.

Reference is now had to FIG. 6 to describe a case where the locally illuminating projector means already described in connection with FIGS. 1 and 2 is added to the range finding device adopting the range finding principle described in connection with FIGS. 3 to 5. In FIG. 6, the object 10 is shown as having a real expanse. Reference numeral 17 denotes the projector means, and 18 a condensing optical system for causing the light emitted from the projector means 17 to be projected to locally illuminate the object within the aforementioned standard field. The projector means 17 and the condensing optical system 18 assume numerical data similar to those shown in FIGS. 1 and 2. Where the object 10 is uniform in brightness or very low in contrast, the line sensor 24 forms a detectable projected image 19 on the object 10 with the aid of the projected light from the projector means 17 and two images 19' and 19" of the projected spot 19 are formed on the light receiving surface of the line sensor 24 through the intermediacy of lenses 11, 12, total reflection mirrors 13, 14 and total reflection prism 15, whereby the scanning output S may be provided on the basis of the principle described in connection with FIG. 3 and the distance of the object 10 may be measured by detecting the interval between signals S'-1 and S'-2 of the then scanning output S which respectivly relate to the two images 19' and 19".

Description will now be made in detail of an embodiment of the range finding device according to the present invention for measuring the object distance in accordance with the scanning signal regarding the object image obtained in the above-described manner or the image of the projected spot formed on the object.

Figure 7A:
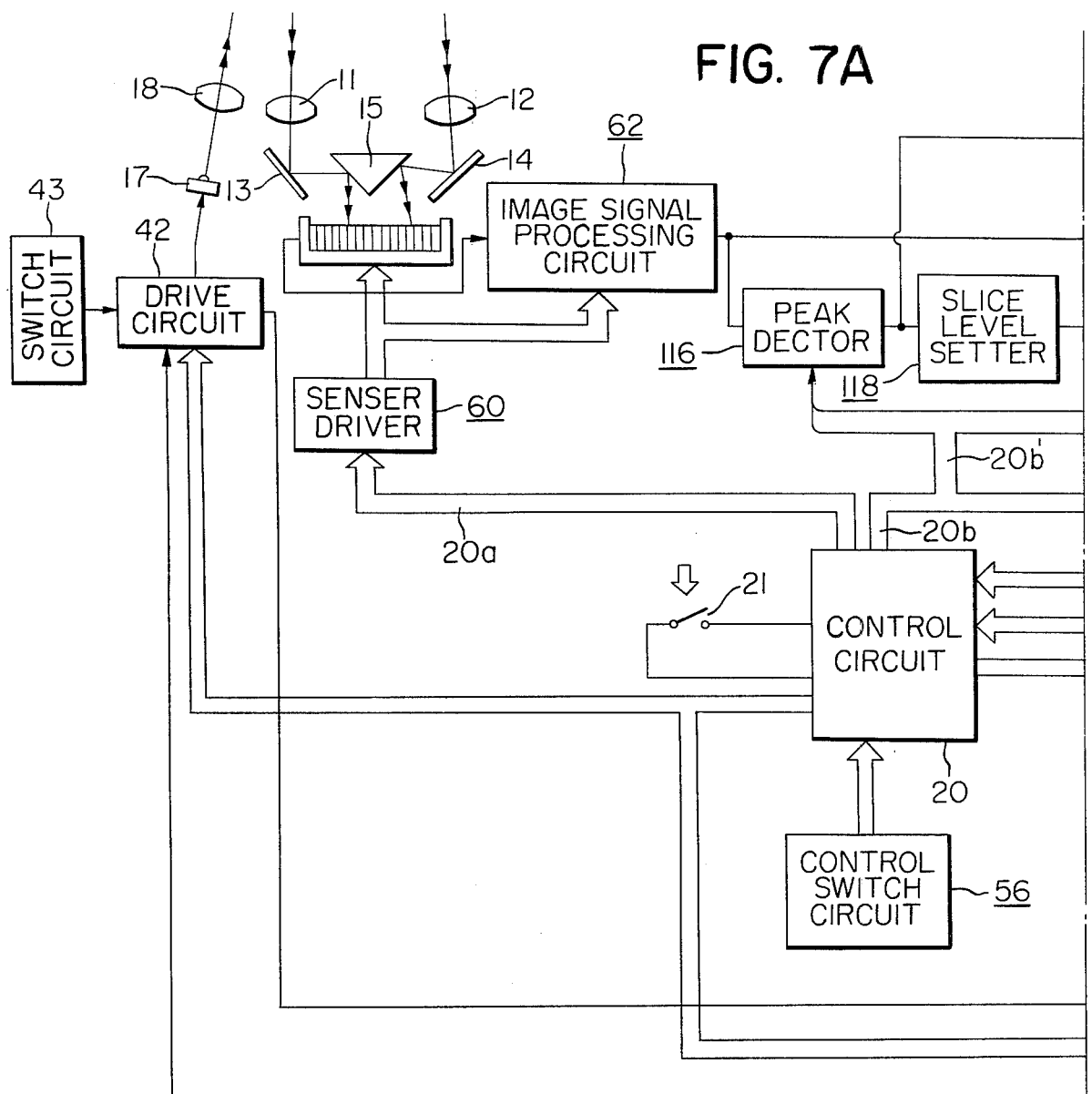
FIG. 7 is a block diagram of the electric circuit system in the range finding device to which the improvement of the present invention is applied.
Figure 7:
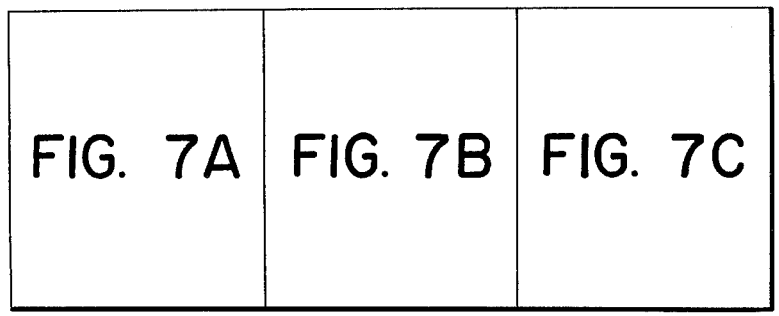
Figure 7C:
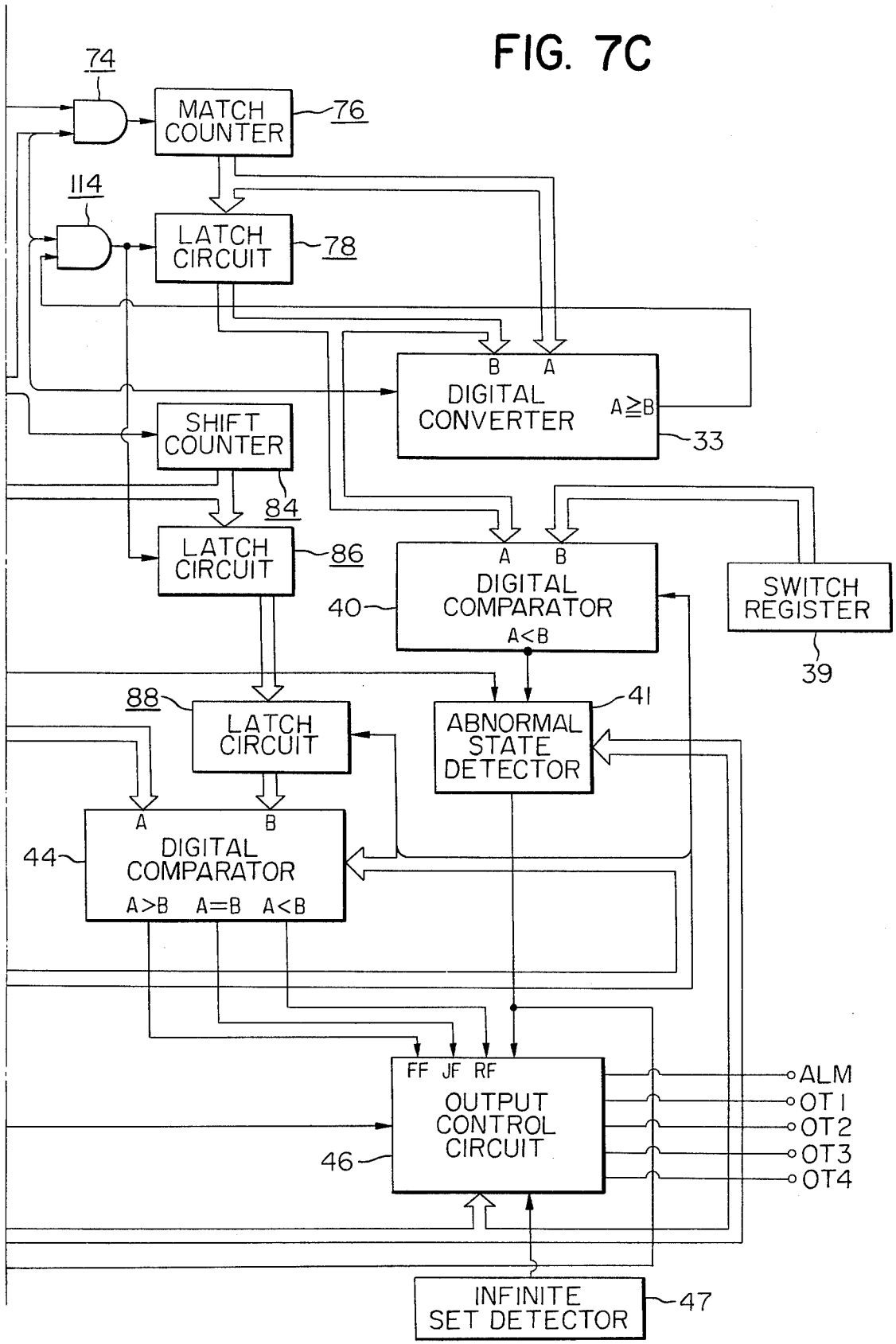

First, in FIG. 7 which shows the construction of the electric circuit system in the range finding device for realizing the above-described range finding method, reference numeral 21 denotes an actuating switch for actuating the circuit system shown herein. The switch 21 may be closed by an unshown actuating member which may be depressed in the direction of the adjacent arrow. Designated by 20 is a control circuit for controlling the entire circuit system. To control the operation sequence of the entire circuit system, the control circuit 20 puts out a drive control signal 20a for drivingly controlling the line sensor 24, a control signal 20b including an image signal conversion control signal 20b' for chefly sequence-controlling the analog circuit system for quantizing (here, binarizing) the image signal taken out from the line sensor 24 and a comparison processing control signal 20b" for mainly sequence-controlling the digital circuit system for comparison-processing the quantized image element signals to obtain a range finding signal, and a range finding result output control signal 20c for controlling the output representing the result of the comparison processing. These control signals are put out in accordance with a predetermined process sequence for the range finding.

Figure 8:
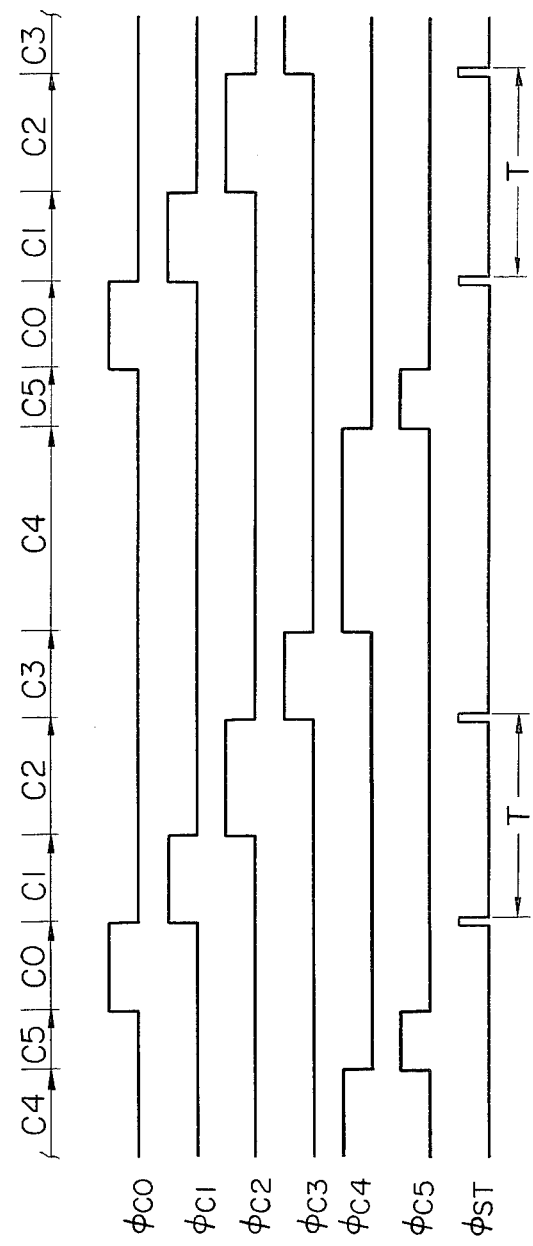
FIG. 8 is a timing chart for illustrating the operation sequence of the FIG. 7 system.

FIG. 8 shows a fine row of operation modes in the operation sequence of the aforementioned entire circuit system. The operation of the circuit system shown herein is divided into six modes. That is, in FIG. 8, in the operation mode C0, the entire system is in waiting condition and discriminates between operate instruction and stop instruction. If the stop instruction is being given, the entire system remains in the operation mode C0 while assuming the waiting condition, but on the other hand, when the operate instruction is given, the entire system shifts into operation mode C1. In the operation mode C1, supply of a start pulse and clock pulse of a suitable frequency (transfer clock) is effected to the line sensor 24, whereby the ineffective signal so far stored in the line sensor 24 is discarded. Thus, the operation mode C1 is an ineffective information discarding mode. When the discard of the ineffective information is terminated in the operation mode C1, the operation mode shifts to mode C2. In this mode C2, the control of the integration time of the image signal in the line sensor 24 is effected in accordance with the brightness of the object whose distance is to be measured. Actually, the image signal integration has already been initiated when the ineffective information is discarded in the mode C1 and therefore, the integration time corresponds to the sum of the mode C1 time and the mode C2 time. The integration of the image signal is effected in this manner and the control of the integration time depending on the condition of the object will later be described. When the operation mode C2 is terminated, the operation mode shifts to C3. In this mode C3, a start pulse and transfer clock are supplied to the line sensor 24, as a result of which the image signal is read out from the line sensor 24 and the image signal so read out is stored as effective information through the signal processing which will later be described. When the taking-out and storage of the image signal, in other words, the taking-in of the data, is terminated, the operation mode shifts to mode C4. In the operation mode C4, the comparison processing for the range finding is effected in accordance with the data taken out in the previous operation mode C3 and subjected to the necessary signal processing and stored. When this is terminated, the operation mode shifts to C5. In the operation mode C5, evaluation of the result obtained in the previous operation mode C4 is effected to thereby effect the control of the picture-taking optical system to the focus position or the display of the failure in the range finding or the like. When the operation mode C5 is terminated, the operation mode of the system returns to C0 to discriminate between the operate instruction and the stop instruction and if the operate instruction is being given, the system repeats the similar operations from the operation mode C1 but if the stop instruction is being given, the system remains in the operation mode C0, assuming the waiting condition. These are the operation modes included in the operation sequence of the present device. Incidentally, these operation modes C0-C5 are successively performed in accordance with mode control 1 signals $\phi$C0-$\phi$C5 (shown in FIG. 8) put out from the mode control counter (to be described) within the control circuit 20 in correspondence with the operation modes C0-C5.

Turning back to FIG. 7, details of the construction and operation of the circuit system in the present device will be described. Designated by 60 is a sensor driver for drivingly controlling the line sensor 24. The sensor driver 60 receives a drive control signal 20a from the control circuit 20 and imparts a start pulse $\phi$ST and transfer clock to the line sensor 24, thereby causing image signal to be put out. In the present device, as shown in FIG. 8, a start pulse $\phi$ST is imparted to the line sensor 24 at the starting point of time of each of the operation modes C1 and C3 for the discard of the ineffective information and for the taking-out of the effective information in each operation sequence and herein, the time interval T from the falling of the start pulse $\phi$ST put out at the starting point of time of the operation mode C1 to the falling of the start pulse $\phi$ST put out at the starting point of time of the operation mode C3 is referred to as the integration time of the effective image information (as already described, this corresponds to the sum of the operation mode C1 time and the operation mode C2 time). During this integration time T, storage of the charge corresponding to the illumination of each image element occurs in each light receiving element 26a of the line sensor 24, and for example, if the integration time is too short for a dark object, the stored charge is too little to take out a sufficient electrical signal. Conversely, if the integration time is too long for a light object, the stored charge becomes excessive to cause the so-called saturation of signal which is inconvenient. Therefore, the present device is so designed that an appropriate integration time is set by an integration time setting circuit which will hereinafter be described, namely, that the integration time T is controlled by controlling the time of the operation mode C2. The time series scanning output regarding the two images of the object put out from the line sensor 24 in the operation mode C3 is such as shown in FIG. 5B. This scanning output is applied to an image signal processing circuit 62, where it is subjected to the processes such as amplification and sample hold to facilitate the subsequent process. The signal put out from the circuit 62 is applied to a peak detector circuit 116 on the one hand, and is applied to a binary circuit 64 which will hereinafter be described, on the other hand. The peak detector circuit 116 is controlled by the control signal 20b' from the control circuit 20 so as to detect the peak value of the signal corresponding to the aforementioned standard field image. The peak value detected by the circuit 116 is used to set the slice level which provides the standard for binarizing the image signal taken out in the operation mode C3 of the next operation sequence. Herein, to simply and accurately detect the signal interval of the two images, a predetermined standard level is set and the obtained image signal is compared with the standard level so that a signal of higher level than the standard level is binarized into, for example, a logic value "1" and a signal of lower level than the standard level is binarized into, for example, a logic value "0", whereby all the subsequent provess is carried out by a binary logic. The standard for the binarization therefor is the abovementioned slice level, which, in the present embodiment, is the level obtained by multiplying the peak value detected by the peak value detector circuit 116 by a number smaller than 1, for example, such as 0.8 . The setting of the slice level is accomplished by dividing the peak value output from the peak detector circuit 116 and this is carried out in the next slice level setting circuit 118. The slice level thus obtained in the slice level setting circuit 118 is controlled by the control signal 20b' from the control circuit 20 so that it is held by the next sample hold circuit 120 until the operation mode C3 in the nxt operation sequence is terminated. The detection of the peak value and the state of setting the slice level in this case are as shown in FIG. 5C. The hold value of the sample hold circuit 120 is rewritten into a new value each time the operation mode C3 is terminated. With such a circuit construction, the slice level held by the sample hold circuit 120 is being applied to one input terminal of the binary circuit 64 and therefore, during the signal reading in the operation mode C3 of the next operation sequence, when the scanning output from the line sensor 24 is applied to the other input terminal of the binary circuit 64, a binarized image element signal is put out from the binary circuit 64. FIG. 5D schematically shows an example of such binarized image element data. Designated by 25 is an integration time setting circuit designed so as to set the appropriate integration time, as described, in accordance with the peak value of the signal detected by the peak detector circuit 116. The output of the circuit 25 is imparted to the control circuit 20, whereby the control circuit 20 controls the time of the operation mode C2, thereby controlling the integration time T of the image signal in the line sensor 24. The binary image element data put out from the binary circuit 64 through the above-described process is directed to a distance detecting system which is controlled by the control signal 20b'' from the control circuit 20. That is, of the binary image element data obtained in the described manner, the binary image element data regarding the standard field image is taken into a shift register 66 for the standard field and the binary image element data regarding the reference field image is taken into shift registers 68, 70 for the reference field. This process is carried out in the operation mode C3 by a field distributing signal in the control signal 20b''. The shift register 68 for the reference field is of the same fit construction as the shift register 66 for the standard field and the shift register 70 is for containing therein the remaining reference field image data. Also, the shift register 70 is a series input-series output non-circulation type shift register, while the shift registers 66 and 68 are series input-series output circulation type shift registers.

Now, when the operation mode C3 is terminated and the operation mode C4 is entered in the described manner, the data contained in the shift registers 66 and 68 are caused to circulatingly shift by one bit each by the control signal 20b'' and during one circulation of this data, the match or non-match between the output data is detected for each bit by an exclusive NOR gate 72 as a match detecting circuit. The then output of this exclusive NOR gate 72 is imparted to a match number counting match counter 76 by an amount corresponding to one circulation of each stored data in the shift registers 66 and 68, through an AND gate 74 which receives the control signal 20b'', and thus the counter 76 begins to count the number of matches during one circulation of each stored data in the shift registers 66 and 68. When one circulation of each stored data in the shift registers 66 and 68 is terminated, the control circuit 20 operates a digital comparator 33 by the control signal 20b'' to cause the comparator to compare the count of the counter 76 with the data stored in a latch circuit 78 for storing a maximum match number (this data is initially "0"). As a result, a high level signal is put out from the comparator 33 only when "the count of the counter 76 ≧ the stored value in the latch circuit 78", and this is imparted to the latch circuit 78 as a data rewrite instruction pulse through an AND gate 114 which receives the control signal from the control circuit 20, whereby the stored value in the latch circuit 78 is rewritten into the then count of the counter 76. The stored value in the latch circuit 78 is initially "0" and accordingly, it will be apparent that during the first circulation comparison the count of the counter 76 is intactly stored in the latch circuit 78. After the data comparison by the comparator 33, the counter 76 is cleared by the control signal 20b'' from the control circuit 20. Now, when the above-described process is terminated, the data contained in the shift registers 68, 70 for the reference field are caused to shift by one bit by the control signal 20b'' and the data in the rightmost bit of the shift register 70 is taken into the leftmost bit of the shift register 68 (at this time, the data at the rightmost bit of the shift register 68 is discarded), and when this is terminated, each stored data on the shift registers 66 and 68 is again caused to cirulatingly shift by the control signal 20b'' and again at this time, the number of matches between the output data of the two shift registers 66 and 68 in this cycle is counted by the counter 76 through the described process. When this count is terminated, the magnitude of the count of the counter 76 in this cycle and the magnitude of the previous match number stored in the latch circuit 78 are compared with each oher by the comparator 33. If the match number obtained in this match detection is equal to or greater than that obtained in the previous match detection, then the data of the latch circuit 78 is imparted the rewrite instruction pulse from the comparator 33 generated under such condition, through an AND gate 114, whereby the match number in this cycle is rewritten. If the match number obtained in this match detection is smaller than that obtained in the previous match detection, the above-described rewriting does not take place but the latch circuit 78 continues to hold the previous match number. While undergoing the above-described comparison and detection process, the stored data in the shift registers 68 and 70 for the reference field are gradually shifted rightwardly, so that a data representing the degree of "similarity" based on the binary data of the image portion of the reference field image which has been regarded as most similar to the standard field image is finally held in the latch circuit 28, while on the other hand it is clear from the range finding principle described in connection with FIGS. 4 and 5 that by detecting how much shift the stored data in the shift registers 68, 70 for the reference field have undergone until such a best degree of match, namely, a maximum match number comes to be obtained, the object distance may be known from the amount of shift.

Description will now be made of the process through which such an amount of shift of the image data, in other words, the distance signal, may be obtained. Designated by 84 is a counter for counting the amount of shift. The counter 84 receives a signal of the control signals 20b from the control circuit 20 which is for generally shifting the data of the reference field shift registers 68, 70 by one bit, and counts that signal. The output of the counter 84 is imparted to a latch circuit 86 for storing the amount of shift during a maximum match. As shown, the latch circuit 86 is designed to latch the count output of the counter 84 each time the content of the latch circuit 78 for storing the maximum match number is rewritten by the output of the AND gate 114 and therefore, the relative amount of shift of the image data when the maximum match has occured during the comparison of the image data is finally left in the latch circuit 86 and the final result thereof, namely, the object distance information, is stored in a distance data storing latch circuit 88 after the operation mode C4 and in the operation mode C5.

The measurement of the object distance is carried out by the signal processing as described above, but actually, where the standard field, for example, is covered by a surface of uniform brightness or an object having little contrast, erroneous range finding often takes place and when a deep object is aimed at, the standard field image sometimes considerably differs from the reference field image and so, the degree of match between the two images becomes low and accordingly, the distance data obtained becomes unreliable. In the present device, according to the improvements of the present invention, such an incomplete state of range finding is detected to ensure the alarm and the range finding operation by the turn-on of the projector means 17 and when incomplete state still occurs to the range finding, setting of the picture-taking optical system, for example, to the infinity focus position may also be effected. The improvements according to the present invention will hereinafter be described.

In FIG. 7, reference numeral 102 designates a binarized state detecting circuit for detecting whether or not the binary image element data put out from the binary circuit 64 is a proper data to effect the distance detection. This circuit 102 is controlled by the control signal 20b'' from the control circuit 20 so as to detect the binarized state of the binary image element data regarding the standard field image to be taken into the shift register 66 in the operation mode C3, and puts out a high level signal representing an improper data when the binary image element data regarding the standard field image are all "1" or "0". That is, the binary circuit 64 is formed by an analog comparator and generally, an analog comparator has a certain degree of insensitive zone in a voltage range near a standard voltage level and accordingly, when the contrast of the object is very low and the level of the scanning output obtained is very near the standard voltage level, an analog comparator puts out binary data which are all "1" or "0". On the other hand, for example, when the binary data regarding the standard field image have all become "1" or "0", there is a very great possibility that, of the binary data regarding the reference field image, a greater number of data than the image element data regarding the standard field image all become "1" or "0" continuously and accordingly, in such a state, proper distance detection is no longer possible. The above-described binarized state detecting circuit 102 is provided to detect such an inconvenient situation.

Designated by 39 is a switch register for putting out a fixed data. In the switch register 39, an allowable minimum match number data which provides the standard for determining whether or not the amount of shift left in the latch circuit 86 at the end of the operation mode C4, namely, the distance data, is reliable is stored in a digital form. This data, with the maximum match number data left in the maximum match number storing latch circuit 78 at the end of the comparison process for the distance detection in the operation mode C4, is applied to a digital comparator 40. The comparator 40 effects the comparison between the two data in the operation mode C5 in accordance with the control signal 20c from the control circuit 20 and only when the maximum match number left in the latch circuit 78 is below the aforementioned allowable minimum match number, the comparator 40 puts out a high level signal representing the match number "small". That is, as already described, when a deep object, for example, is aimed at, the standard field image considerably differs from the reference field image so that the degree of match between the two images is low and therefore, in such a case, the distance data left in the latch circuit 86 in the operation mode C4 is not at all reliable. The switch register 39 and the comparator 40 are provided to detect such an inconvenient situation. The numerical data stored in the switch register 39 is a value which is about 90% of the ideal maximum match number, namely, the number of image elements contained in the standard field area P (shown in FIG. 5A) and for example, a value of the order of "58" when the set number of image elements in the standard field area P is "64", and this is empirically determined with various conditions taken into account.

The thus obtained output signal from the binarized state detecting circuit 102 representing an improper image element data and the signal from the comparator 40 representing the match number "small" are both applied to an abnormal state detector circuit 41 and even if any state occurs, a high level signal informing of the occurrence of an abnormal state is put out from the abnormal state detector circuit 41 in the operation mode C5. When the occurrence of an abnormal state is informed of, a signal representing this is imparted to the driving circuit 42 for the projector means 17, whereby the driving circuit 42 is set to a state in which the power supply from a power source circuit 43 to the projector means 17 is possible. In this state, when the mode control signal $\phi C1$ (shown in FIG. 8) representing the operation mode C1 is put out from the control circuit 20, the driving circuit 42 turns on the projector means 17 and thereafter, when the mode control signal $\phi C3$ representing the operation mode C3 is put out, the driving circuit 42 turns off the projector means 17. In this manner, in the present device, when the incompleteness of the distance detection is detected by the abnormal state detector circuit 41, the projector means 17 is turned on in synchronism with the initiation of the integration of the effective image signal in the line sensor 24, as a result of which the effect as described in connection with FIG. 6 is obtained so that a complete range finding operation is ensured even for an object of low brightness or an object of uniform brightness or very low contrast.

Description will now be made of a method whereby the result of the range finding obtained in the above-described process is used for the control of the picture taking optical system. The result of the range finding, namely, the signal from the distance data storing latch 88, is applied to a digital comparator 44 for discriminating the focus adjusted state of the picture-taking optical system (not shown). On the other hand, a signal corresponding to the adjusted state of the picture-taking optical system, not shown, which is the output from a picture-taking optical system adjust position information output circuit 45 is applied to the comparator 44 in digital words and the two signals are compared in the comparator 44, which thus puts out a signal corresponding to the focusing or the distinction between the forward focusing and the backward focusing. This comparison result output is applied to an output control circuit 46, which thus effects the control of the focusing operation of the picture-taking optical system.

On the other hand, when occurrence of an abnormal state is detected by the abnormal state detector circuit 41, the output thereof is imparted to the aforementioned output control circuit 46, and here, the operating signal of the driving circuit 42 for the projector 17 may further be imparted to the circuit 46 and therefore, the circuit 46 discriminates between the presence and absence of the operating signal from the driving circuit 42 and effects warning or the setting of the picture-taking optical system to the infinity focus position when occurrence of an abnormal state is still detected by the abnormal state detector circuit 41 with the operating signal put out, in other words, with the projector 17 turned on. In this case, it is also possible that information about the camera's set aperture value is applied to effect the setting to a pan-focus position corresponding to the set aperture value. The above-described picture-taking optical system adjust position information output circuit 45 has the function of converting the output of pulse generating means, potentiometer or digital code switch operatively associated with the picture-taking optical system into a signal form (digital word) comparable with the distance data and putting out such converted signal. Designated by 47 is an infinity detector circuit for detecting whether or not the picture-taking optical system has been set to the infinity focus position and the output thereof is imparted to the output control circuit 46. Denoted by 56 is a control switch circuit for changing over the operation mode of the present device. The switch circuit 56 has the function of arbitrarily changing over the operation mode of the present device from outside and causing, for example, the range finding operation to be terminated only for once and permitting the distance signal obtained at this time to be fixedly held as required, and it changes over the device sequence from a continuous sequence to a single sequence, thereby causing the above-described operation to be effected. That is, when the operate instruction continues to be put out in the operation mode C0, a continuous range finding operation is effected and when the stop instruction is being put out in the operation mode C0, the device assumes its waiting condition to permit the range finding result till then to be held, and the control switch circuit 56 is for giving such operate or stop instruction.

Figure 16:
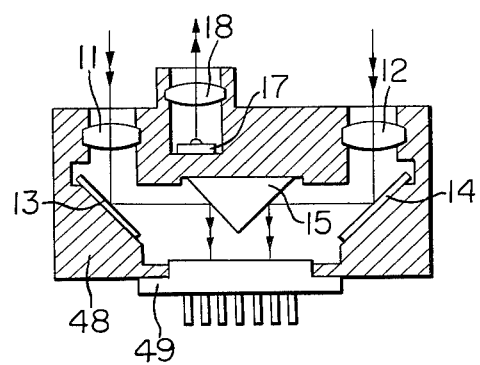

Here, details of the construction of the FIG. 7 circuit system so far described will be further described. The circuit blocks designated by underlined reference characters in FIG. 7, namely, the circuit blocks 60, 62, 116, 118, 120, 64, 102, 66, 68, 70, 72, 74, 76, 78, 114, 84, 86, 88 and 56 intactly correspond to the circuit blocks designated by the same reference characters in FIG. 11 of the U.S. application Ser. No. 944,974 (No. P 28 42 3448.5), and the specific constructions of these are as shown in FIGS. 16 and 20 of the aforementioned copending application. Also, the control circuit 20 comprises a mode control counter 52, a mode counter controller 54, a sequence controller 58, a sequence counter 126, a sequence decoder 128, a data take-in controller 130, a data process controller 132 and a counter controller 136, all being shown in FIG. 11 of the said copending application. Incidentally, the mode control signals $\phi C0$–$\phi C5$ shown in FIG. 8 are all put out from the mode control counter included in the control circuit 29 (details of such mode control counter are shown at 256 in FIG. 20A of the aforementioned copending application). As the integration time setting circuit 25, the construction shown in FIG. 24 of the said copending application is adopted and the output thereof is imparted to the mode counter controller included in the control circuit 20. Also, as the picture-taking optical system adjust position information output circuit 45, it is possible to adopt, in accordance with the intended purpose, a combination of the potentiometer PM and the A-D converter ADC in the construction shown in, for example, FIG. 28 of the said copending application, or a combination of the digital encoder EDC and the brush BR shown in FIG. 29 of the said copending application, or a combination of the pulse plate 654 and the brush 652 shown in FIG. 35 of the said copending application and a conventional binary counter. As regards the other circuit blocks, for example, the comparators 33, 40, 44 and the switch register 39 may be those commercially available (particularly, the switch register 39 may be the switch register 554 shown in FIG. 20D of the said copending application).

Thus, detailed description need no longer be made of the circuit blocks pointed out above. Therefore, description will hereinafter be made only of the portions which greatly differ from the construction of the device covered by the said copending application, namely, the abnormal state detector circuit 41, the projector means driving circuit 42, the output control circuit 46 and the infinity setting detector circuit 47.

Figure 10:
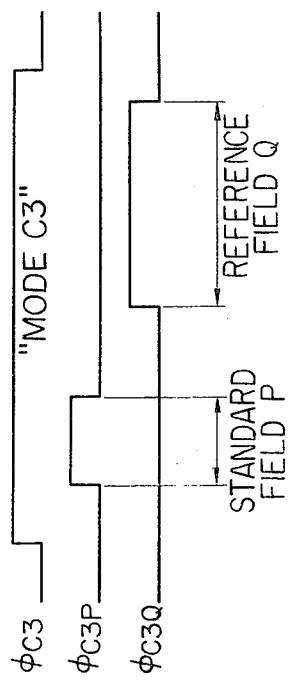
FIG. 10 is a timing chart showing the data take-in instruction imparted to the binarized state detection circuit.
Figure 9:
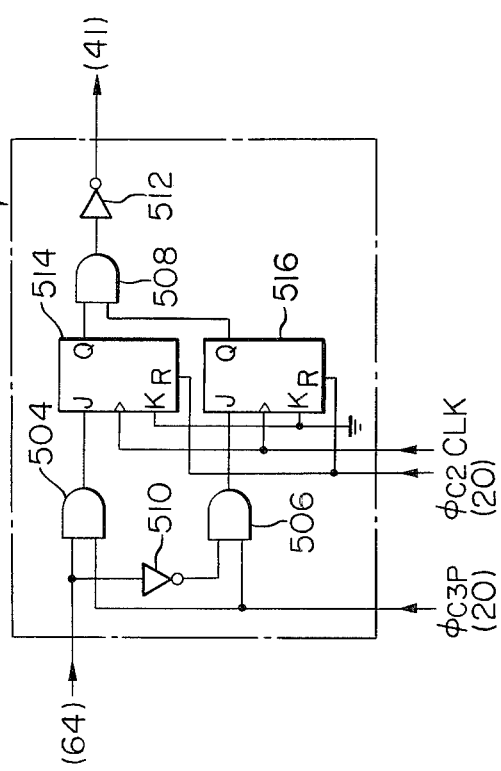
FIG. 9 is a logic circuit diagram showing the details of the binarized state detection circuit in the FIG. 7 circuit system.

First, details of the binarized state detector circuit 102 will be described for reference. In FIG. 9, reference numeral 504 designates an AND designed to receive the output data from the binary circuit 64 and a standard field data take-in instruction $\phi C3P$ (see FIG. 10) put out from the control circuit 20 in the operation mode C3 to thereby put out only the binary image element data regarding the standard field image out of the binary image element data obtained in the operation mode C3. Reference numeral 506 designates an AND gate designed to receive the output data from the binary circuit 64 which is inverted by an inverter 510 and the above-mentioned take-in instruction $\phi C3P$ to thereby put out the binary image element data regarding the standard field image in inverted logic. Designated by 514 and 516 are JK type flip-flops designed to be reset by the mode control signal $\phi C2$ (see FIG. 8) from the control circuit 20 representing the operation mode C2 and to be driven by a clock pulse CLK which is the same as the transfer clock to the line sensor 24. The K input terminals of these flip-flops are both grounded. The flip-flops 514 is adapted to receive the output of the AND gate 504 at the J input terminal thereof and the flip-flop 516 is adapted to receive the output of the AND gate 506 at the J input terminal thereof. Denoted by 508 is an AND gate for taking the logic product of the Q outputs of the flip-flops 514 and 516. Designated by 512 is an inverter for putting out the output of the AND gate 508 in inverted logic.

In such a construction, when the operation mode C2 is started, the flip-flops 514 and 516 are reset by the then mode control signal $\phi C2$ and the Q outputs thereof both assume low level. Next, when the operation mode C3 is entered, the binary image element data regarding the standard field image may be put out through the AND gate 504 and the inverted data thereof may be put out through the AND GATE 506, and if "1" data is once put out from the AND gate 504, the Q output of the flip-flop 514 is thereby changed from low to high in synchronism with the falling of the clock pulse CLK, whereas if "1" data is never put out from the AND gate 504 (this means that the binary image element data regarding the standard field image are all "0"), the Q output of the flip-flop 514 remains low. Thus, the AND gate 504 and the flip-flip 514 together constitute a system for detecting whether or not the binary image element data regarding the standard field image are all "0", and the "low" of the Q output of the flip-flop 514 represents the fact that the binary image element data regarding the standard field image are all "0". On the other hand, if "1" data is once put out from the AND gate 506, the Q output of the flip-flop 516 is thereby changed from low to high in synchronism with the falling of the clock pulse CLK, whereas if "1" data is never put out from the AND gate 506 (this means that the binary image element data regarding the standard field image are all "1"), the Q output of the flip-flop 516 remains low. Thus, the inverter 510, the AND gate 506 and the flip-flop 516 together constitute a system for detecting whether or not the binary image element data regarding the standard field image are all "1", and the "low" of the Q output of the flip-flop 516 represents the fact that the binary image element data regarding the standard field image are all "1". Thus, when the binary image element data regarding the standard field image are all "1" or "0", a high level signal is put out from the inverter 512.

The standard field data take-in instruction φC3P imparted to the AND gates 504 and 506 is put out in the operation mode C3 as one representing the read-out period of the output for the standard field area P set to the line sensor 24 which has been described in connection with FIG. 5, and thus is put out from the data take-in controller in the control circuit 20. Also, in this case, if the signal φC3Q (see FIG. 10) representing the read-out period of the output for the reference field area Q is obtained from the data take-in controller and this is further imparted to the AND gates 504 and 506 as the reference field data take-in instruction, it will be apparent that detection may be effected as to whether or not the binary image element data regarding both the standard field image and the reference field image are all "1" or "0".

Figure 11:
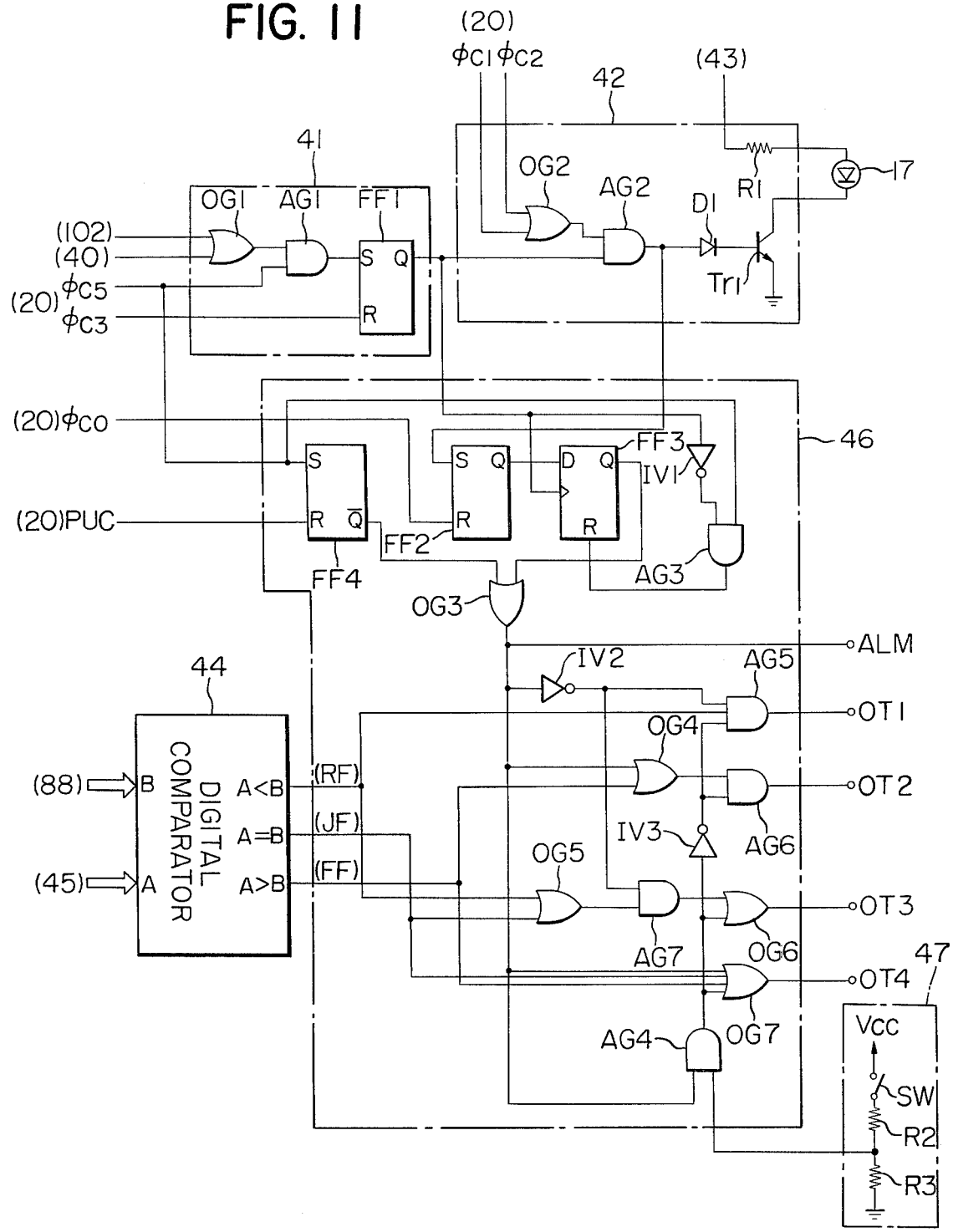
FIG. 11 is a logic circuit diagram showing the details of the abnormal state detection circuit, the projector means driving circuit, the output control circuit and the infinity setting detection circuit in the circuit system of FIG. 7.

FIG. 11 shows details of the abnormal state detector circuit 41, the projector means driving circuit 42, the output control circuit 46 and the infinity setting detector circuit 47.

The abnormal state detector circuit 41, as shown, comprises an OR gate for taking the logic sum of the output of the binarized state detector circuit 102 and the output of the comparator 40, an AND gate AG1 for taking the logic product of the output of the OR gate OG1 and the mode control signal φC5 (see FIG. 8) from the control circuit 20 representing the operation mode C5, and an RS flip-flop FF1 designed to be set by the output of the AND gate AG1 and reset by the mode control signal φC3 (see FIG. 8) from the control circuit 20 representing the operation mode C3. According to such a construction, in the above-described operation sequence, when the operation mode shifts from C2 to C3, the flip-flop FF1 is reset by the then mode control signal φC3. Further, as already described, in this operation mode C3, the binarized state detector circuit 102 effects the detection as to whether or not the binary image element data regarding the standard field image are all "1" or "0". As the operation mode progresses from C4 to C5, as already described, the comparison between the maximum match number stored in the latch circuit 78 and the allowable minimum match number which is the output of the switch register 39 is effected by the comparator 40. Therefore, if at least one of improper image element data and match number "small" has occurred, the output of the OR gate OG1 becomes high so that, when the mode control signal φC5 is imparted to the AND gate AG1 in the operation mode C5, the then output of the AND gate AG1 becomes high, whereby the flip-flop FF1 is set and the output thereof becomes high. Thus, by the high level of the Q output of the flip-flop FF1, the occurrence of an abnormal state is informed of. Of course, if no abnormal state has occurred, the output of the OR gate OG1 remains low, so that the flip-flop FF1 remains reset and therefore, the Q output thereof remains low.

The projector means driving circuit 42, as is well-known, comprises an OR gate OG2 for taking the logic sum of the mode control signals φC1 and φC2 from the control circuit 20 representing the operation modes C1 and C2, and AND gate AG2 for taking the logic product of the output of the OR gate OG2 and the Q output of the flip-flop FF1 in the abnormal state dector circuit 41, an npn switching transistor Tr1 whose base is adapted to receive the output of the AND gate AG2 through a reverse current preventing diode D1, and a protective resistor R1, and the projector means 17 is connected to the collector side of the transistor Tr1 with the protective resistor R1. In such a construction, the output of the OR gate OG2 is high during the operation modes C1 and C2 and therefore, if the output of the abnormal state detector circuit 41, namely, the Q output of the flip-flop FF1, has become high at this time, the output of the AND gate AG2 is high during this time so that the transistor Tr1 is turned on to turn on the projector means 17 and thus, the projector means 17 is turned on during the operation modes C1 and C2 in the next operation sequence, that is, during the time the integration of the effective image signals is effected in the line sensor 24, under the condition that an abnormal state has occurred.

The infinity setting detector circuit 47 comprises a normally open switch SW adapted to be closed when the unshown picture-taking optical system reaches the infinity focus position and voltage dividing resistors R2 and R3 series-connected to the switch SW, said switch SW and said resistors R2 and R3 being connected to a power source. According to such a construction, when the picture-taking optical system reaches the infinity focus position, the switch SW is closed and therefore, the potential at the junction between the resistors R2 and R3 changes from low to high and thus, a signal representing whether or not the picture-taking optical system has reached the infinity focus position may be obtained at the junction between the resistors R2 and R3.

Lastly, the output control circuit 46 has the following construction. In the Figure, FF2 is an RS type flip-flop adapted to be set by the output of the AND gate AG2 in the aforementioned projector means driving circuit 42 and reset by the mode control signal φC0 (see FIG. 8) from the control circuit 20 representing the operation mode C0, and this is for storing the fact that the projector means 17 has been turned on, during one operation sequence. FF3 is a D type flip-flop of the synchronous rising type which receives the Q output of the flip-flop FF2 at the D input thereof and which is adapted to be triggered by the rising of the abnormal state detector circuit 41, namely, the Q output of the flip-flop FF1 and reset by the output of the AND gate AG3 which takes the logic product of the inverted output of the Q output of the flip-flop FF1 inverted by an inverter IV1 and the mode control signal φC5 from the control circuit 20. In such a construction, after the flip-flop FF2 has been reset in the operation mode C0 and when the output of the AND gate AG2 in the driving circuit 42 becomes high in the next operation mode C1, the flip-flop FF2 is set and the Q output thereof changes from low to high. In this state, when the Q output of the flip-flop FF1 in the abnormal state detector circuit 42 becomes high in the operation mode C5, the flip-flop FF3 is triggered by the rising thereof and the Q output thereof changes from low to high and such state is maintained until the Q output of the flip-flop FF1 becomes low in the operation mode C5, namely, until the abnormal state disappears. What has been described above constitutes a system for detecting whether or not an abnormal state occurs even when the projector means 17 is turned on, and by the high level of the Q output of the flip-flop FF3, it is indicated that an abnormal state continues to occur even when the projector means 17 has been turned on. Thereafter, if the occurrence of the abonormal state disappears, the Q output of the flip-flop FF1 remains low so that the output of the AND gate AG3 becomes high in the operation mode C5, whereby flip-flop FF3 is reset and the output thereof changes from high to low.

FF4 is an RS type flip-flop adapted to be set by the mode control signal φC5 from the control circuit 20 and reset by a power up clear signal PUC put out from the control circuit 20 during the closing of a main switch 21 shown in FIG. 7. Although it has not been described in connection with the construction of the circuit system shown in FIG. 7, this flip-flop FF4 is provided to discriminate whether or not the operation sequence is the first operation sequence (i.e., the "first stage") after the closing of the main switch 21. That is, the flip-flop FF4 is reset by the power up clear signal PUC put out from the control circuit 20 during the closing of the main switch 21 for starting the range finding operation, whereafter in the operation mode C5 in the first operation sequence, it is set by the mode control signal φC5 and therefore, the $\overline{Q}$ output thereof becomes high during the time from after the closing of the switch 21 until the operation mode C5 is reached for the first time and thus, by the high level of the $\overline{Q}$ output, it is indicated that the operation sequence is the first operation sequence.

OG3 is an OR gate for taking the logic sum of the Q output of the flip-flop FF3 and the $\overline{Q}$ output of the flip-flop FF4, AG4 is an AND gate for taking the logic product of the output of the OR gate OG3 and the output of the infinity setting detector circuit 47, and AG5 is an AND gate for taking the logic sum of the inverted output of the output of the OR gate OG3 inverted by an inverter IV2 and the inverted output of the output of the AND gate AG4 inverted by an inverter IV3 and the "A<B" output of the comparator 44, the output of the AND gate AG5 being put out through an output terminal OT1. OG4 is an OR gate for taking the logic sum of the output of the OR gate OG3 and the "A>B" output of the comparator 44, and AG6 is an AND gate for taking the logic product of the output of the OR gate OG4 and the inverted output of the AND gate AG4 inverted by the inverter IV3, the output of the AND gate AG6 being put out through an output terminal OT2. OG5 is an OR gate for taking the logic sum of the "A<B" output and the "A=B" output of the comparator 44, AG7 is an AND gate for taking the logic product of the output of the OR gate OG5 and the inverted output of the OR gate OG3 inverted by the inverted IV2, and OG6 is an OR gate for taking the logic sum of the output of the AND gate AG7 and the output of the AND gate AG4, the output of the OR gate OG6 being put out through an output terminal OT3. OG7 is an OR gate for taking the logic sum of the output of the OR gate OG3 and the output of the AND gate AG4 and the "A=B" output and the "A>B" output of the comparator 44, the output of the OR gate OG7 being put out through an output terminal OT4. What has been described above constitutes the logic for the output control.

Incidentally, where the input from the picture-taking optical system adjust position information output circuit 45 shown in FIG. 7 is A and the input from the latch circuit 88 is B, the compartor 44 puts out three different discrimination signals, "A<B", "A=B" and "A>B", in accordance with the magnitudes of these two inputs A and B, and in the system shown in FIG. 7, as is apparent from the principle of distance detection described in connection with FIGS. 4 and 5, the distance data stored in the latch circuit 88 is a digital data with the infinity as the standard, namely, with the infinity as "0", and a digital data in a similar form may also be put out from the picture-taking optical system adjust position information output circuit 45. Therefore, as regards the three outputs of the comparator 44, "A<B" means that the picture-taking optical system is set to a shorter distance side than the detected object distance and this also means that the picture-taking optical system is in the state of "backward focusing", and "A=B" represents the fact that the adjusted distance of the picture-taking optical system has become coincident with the object distance, that is, represents the "focused" condition.

Figures 12, 13:
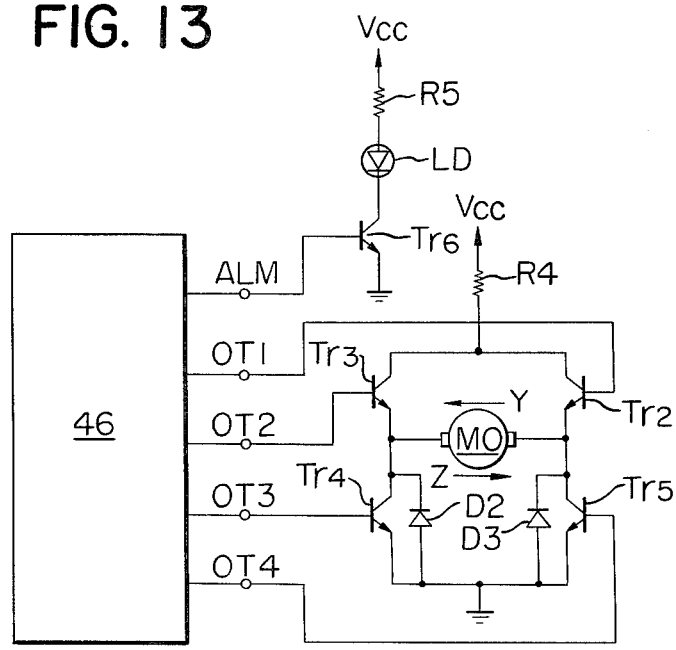
FIG. 12 shows the output form from the output control circuit.
FIG. 13 is a circuit diagram showing an example of the case where the automatic focus control of the picture-taking optical system is effected by utilizing the output of the output control circuit.

Under such setting, description will now be made of the form of the output from the logic for the output control. In the normal proper operative state, namely, in a state which is neither the first stage nor the abnormal state, the output of the OR gate OG3 is low and accordingly, the output of the AND gate AG4 is also low and therefore, the then outputs of the inverters IV2 and IV3 are high. Accordingly, if, in this state, the "A<B" output of the comparator 44, for example, has become high, only the outputs of the AND gate AG5 and the OR gate OG6 become high and on the other hand, if the "A>B" output has become high, only the outputs of the AND gate AG6 and the OR gate OG7 become high, and if the "A=B" output becomes high, only the outputs of the OR gates OG6 and OG7 become high. Thus, in the normal proper operative state, in the case of "backward focusing", as shown in FIG. 12, the outputs from the output terminals OT1 and OT3 become high while, on the other hand, the outpus from the output terminals OT2 and OT4 become low. In the case of "forward focusing", the outputs from the output terminals OT2 and OT4 become high while, on the other hand, the outputs from the output terminals OT1 and OT3 become low. In the case of "focused", the outputs from the output terminals OT3 and OT4 become high while, on the other hand, the outputs from the output terminals OT1 and OT2 become low.

Next, in the condition wherein the abnormal state is not caused to disappear even by the first stage or the turn-on of the projector means 17, the output of the OR gate OG3 becomes high and therefore, the output of the inverter IV2 becomes low. In this state, if the picture-taking optical system is not set to the infinity focus position and accordingly the output of the infinity setting detector circuit 47 is low, the output of the AND gate AG4 is low and accordingly, the output of the inverter IV3 is high. In this case, therefore, only the outputs of the AND gate AG5 and the OR gate OG6 are high as in the above-mentioned case of "forward forcusing". If, in this state, the picture-taking optical system is adjusted to the infinity focus position, the output of the infinity setting detector circuit 47 becomes high and accordingly the output of the AND gate AG4 becomes high while the output of the inverter IV3 becomes low. Accordingly, in this case, only the outputs of the OR gates OG6 and OG7 become high as in the above-mentioned case of "focused". Thus, in the condition wherein the abnormal state is not caused to disappear even by the first stage or the turn-on of the projector means 17, if the picture-taking optical system is not adjusted to the infinity focus position, as shown in FIG. 12, the outputs from the output terminals OT2 and OT4 become high while the outputs from the output terminals OT1 and OT3 become low, and when the picture-taking optical system is adjusted to the infinity focus position, the outputs from the output terminals OT3 and OT4 become high while the outputs from the output terminals OT1 and OT2 become low.

It is to be noted that the output of the OR gate OG3 is on the one hand put out through an alarm signal output terinal ALM as an alarm signal warning that the abnormal state is not caused to disappear even by the first stage or the turn-on of the projector means 17.

Reference is now had to FIG. 13 to describe an example of the case where the output signals put out from the output control circuit 46 through the output terminals OT1-OT4 in the described manner are utilized to effect the automatic focus control of the picture-taking optical system.

In FIG. 13, MO is a motor for driving the picture-taking optical system, AND Tr2-Tr5 designate complementarily connected npn switching transistors whose bases are respectively connected to the output terminals OT1-OT4 of the control circuit 46. The collectors of the transistors Tr2 and Tr3 are connected to the positive side of a power source through a protective resistor R4 and the emitters of the transistors Tr4 and Tr5 are connected to the ground. The motor MO is connected to the midpoint of the complementary connection between these transistors Tr2-Tr5. D2 and D3 are diodes for eliminating the counter electromotive force of the motor MO during the stoppage thereof and these diodes are parallel but reversely connected to the transistors Tr5 and Tr6. LD is an alarm display light-emitting diode which is connected to the collector of an npn switching transistor Tr6 with a protective resistor R5. The transistor Tr6 has its base connected to the alarm signal output terminal of the output control circuit 46.

In such a connection and construction, when the picture-taking optical system is in the "backward focusing" state in the normal proper operative condition, the transistors Tr3 and Tr5 are turned off while the transistors Tr2 and Tr4 are turned on, so that the motor MO is supplied with power in the direction of arrow Y and thus rotates in the normal direction, but when the picture-taking optical system is in the "forward focusing" state, the transistors Tr2 and Tr4 are turned off while the transistors Tr3 and Tr5 are turned on, so that the motor MO is supplied with power in the direction of arrow Z and rotates reversely and when the "focused" condition is reached, the transistors Tr2 and Tr3 are turned off so that the power supply to the motor MO is cut off and the motor is stopped. Therefore, the automatic focus control of the picture-taking optical system may be achieved if such a design is made that the picture-taking optical system is adjusted to the short distance side by the normal rotation of the motor MO and to the longer distance side by the reverse rotation of the motor MO.

On the other hand, under the situation wherein the abnormal state is not caused to disappear even by the first stage or the turn-on of the projector means, the transistor Tr2 and Tr4 remain turned on and the transistors Tr3 and Tr5 remain turned on until the picture-taking optical system is adjusted to the infinity focus position, so that the motor MO continues its reverse rotation and accordingly, the picture-taking optical system continues to be adjusted to the longer distance side. When the picture-taking optical system reaches the infinity focus position, the transistors Tr2 and Tr3 are turned off so that the motor MO is stopped from rotating and accordingly, the picture-taking optical system is stopped at the infinity focus position.

When the motor MO is stopped, the transistors Tr4 and Tr5 are turned on so that the counter electromotive force generated during the stoppage of the motor MO is eliminated through the diode D2 or D3 and moreover, at this time, brake is exerted by the turn-on of the transistors Tr4 and Tr5 so that the motor MO becomes quickly stopped. Also, in the normal proper operative state, the output from the alarm signal output terminal ALM is low and therefore, the transistor Tr6 remains turned off, so that the light-emitting diode LD is not turned on while, on the other hand, if the abnormal state is not caused to disappear even by the first stage or the turn-on of the projector means, the output from the alarm signal output terminal ALM becomes high so that the transistor Tr6 is turned on and accordingly, the light-emitting diode LD is turned on to display the alarm.

Figure 14:
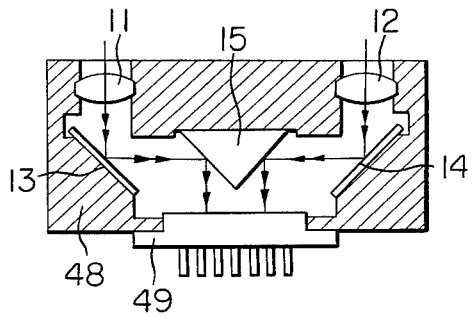
FIGS. 14, 15 and 16 are schemas showing examples of the construction in which the device of FIG. 7 is formed into a unit.
Figure 15:
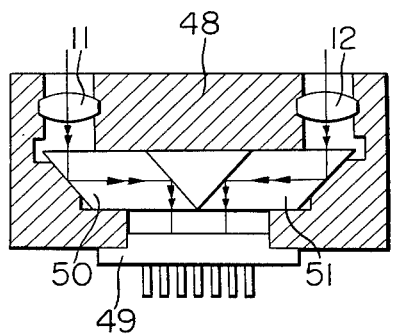

In the range finding device described hitherto, almost all of the signal processing circuit portion including the line sensor may be formed as an integrated circuit structure and by doing so, the device may be made compact and ligher in weight and may thus be readily incorporated into ordinary cameras. FIGS. 14, 15 and 16 show three examples of the case where the electric circuit system in the above-described range finding device is made into an integrated circuit and contained in a common housing with the range finding optical system shown in FIG. 4. In these Figures, the elements designated by reference numerals situated to those in FIG. 4 are similar in construction and function to those described in connection with FIG. 4. The example shown in FIG. 14 is one which intactly uses the range finding optical system 11-15 of FIG. 4, and the range finding optical system 11-15 is fixedly disposed in the housing 48. Denoted by 49 is a range finding IC unit contained in a case by making the circuit system of FIG. 7 into an integrated circuit. Of course, the range finding IC unit 49 has an opening portion formed of optical glass or transparent plastics at a portion on which two light beams impinge, and the light beam may reach the line sensor through such opening portion. The example shown in FIG. 15 uses diamond-shaped prisms 50 and 51, instead of the total reflection mirrors 13, 14 and the total reflection prism 15, to form a range finding optical system. The example shown in FIG. 15 is functionally similar to the example shown in FIG. 14. In these embodiments shown in FIGS. 14 and 15, the projector means 17 and the condensing optical system 18 are disposed outside the housing 48 and adjacent to the lens 11 as far as possible and are connected to the predetermined output terminals of the range finding IC unit. Next, the example shown in FIG. 16 is one in which the projector means 17 and the condensing optical system 18 are integrally assembled to the range finding module shown in FIG. 14. In this case, the projector means 17 and the condensing optical system 18 need be as proximate as possible to the lens 11 which is caused to aim at the standard field. In this manner, the projected image 19 may be formed within the standard field as described in connection with FIG. 6.

Figure 17:
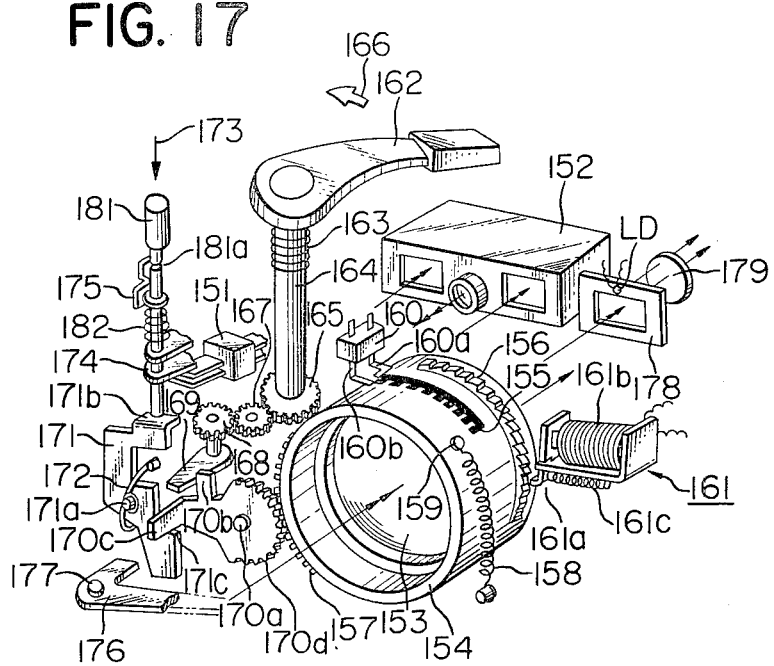
FIG. 17 is a perspective view showing essential portions of an example of the automatic focusing still camera constructed by utilizing the device of FIG. 7.

Lastly, FIG. 17 shows an embodiment in which the above-described range finding device is utilized to form an automatic focusing camera. In FIG. 17, reference numeral 152 designates the range finding module shown in FIG. 16 which includes a range finding optical system, a line sensor, a signal processing circuit and projector means. Designated by 153 is a picture-taking lens mounted to an unshown housing and capable of being focused with respect to an object by being axially moved back and forth, for example, by a conventional helicoid or the like. The lens 153 is held by a lens barrel 154. Secured on the surface of the lens barrel 154 are a rotation amount pulse generating conductive piece 155 formed of an electrically conductive material, a quick stop claw 156 and a gear portion 157 formed so as to mesh-engage a gear which is a part of a moving mechanism for moving the picture-taking lens 153 to a specific position (in the present embodiment, a position near the closest position) by the film advance operation of the camera which will hereinafter be described. Further fixed to the lens barrel 154 is a pin 159 for securing one end of a spring 158 having the other end secured to the camera housing. Accordingly, the lens barrel 154 may be rotated clockwisely about the optical axis of the lens 153 by the spring 158, as viewed in the Figure. Designated by 160 is a contactor adapted to contact the rotation amount pulse generating conductive piece 155 and having two contact pieces 160a and 160b adapted to be closed at a frequency proportional to the amount of rotation of the lens barrel 154. A signal representing the conductive or the monoconductive state of the contactor 160 is applied to the picture-taking optical system adjust position information output circuit 45 of FIG. 7 in the range finding module 152 and converted into a signal representing the amount of movement of the picture-taking lens 153. In this case, therefore, the circuit 45 is formed by a binary counter or the like. Designated by 161 is picture-taking lens stop means including an electromagnetic coil 161b excited in response to the output signal from the range finding module 152, namely, the output signal from the output control circuit 46 shown in FIGS. 7 and 11, to attract a movable piece 161a. The movable piece 161a is normally maintained out of engagement with the quick stop claw 156 by a spring 161c, but when the electromagnetic coil 161b is excited in response to the above-described output signal, the movable piece 161a is attracted against the force of the spring 161c so that the tip end thereof is engaged with the quick stop claw 156, thereby quickly stopping the lens barrel 154 which is being rotated by the force of the spring 158.

Figure 18:
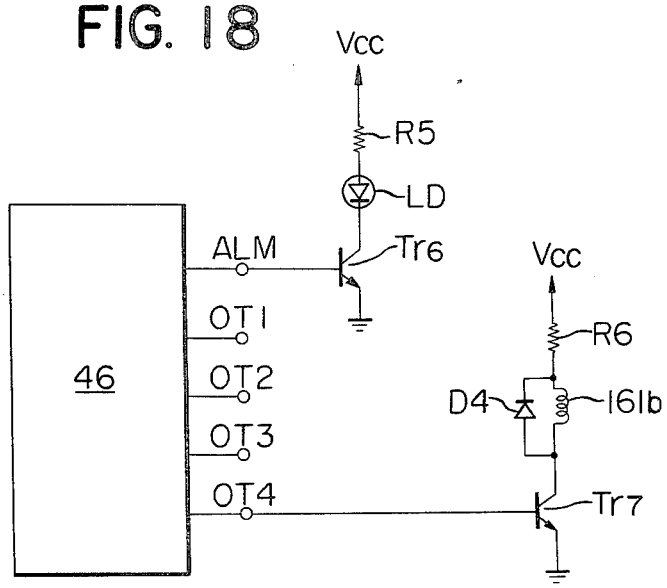
FIG. 18 is a circuit diagram showing the connection and construction for controlling the picture-taking lens stop means in the camera of FIG. 17.

The camera of this embodiment, as will further be described, adopts a method whereby the focus detection may take place in the course wherein the picture-taking lens 153 is moved from the infinity focus position toward the closest focus position by the spring 158 and at the point of time whereat the focus has been detected, the electromagnetic coil 161b is excited to attract the movable piece 161a and stop the picture-taking lens 153 at the focus position, and accordingly, only the output from the output terminal OT4 of the output control circuit 46 is utilized for the control of the electro-magnetic coil 161b. More specifically, as shown in FIG. 18, an npn switching transistor Tr7 having its base connected to the output terminal OT4 of the output control circuit 46 is provided and the electromagnetic coil 161b is connected to the collector side of the transistor Tr7 with a protective resistor R6 and a diode D4 for eliminating the counter electromotive force, so that when the distance detection has been properly effected, the electromagnetic coil 161b may be excited by the turn-on of the transistor Tr7 when the picture-taking lens 153 has reached its focused position in the course of movement thereof, whereby the lens 153 may be stopped, and in the condition wherein the proper distance detection is not achieved even by the first stage or the turn-on of the projector means 17, the electromagnetic coil 161b may be excited from the first and even if camera release is effected in such a state, the picture-taking lens 153 may remain locked in the infinity focus position.

Designated by 162 is the camera's film advance lever. This lever 162 is maintained biased to the shown position by a helical spring 163. Designated by 164 and 165 are a shaft and a gear, respectively, which are rotatable with the film advance lever 162. If the film advance lever 162 is rotated in the direction of arrow 166, film advance and shutter charge are effected by an unshown known mechanism. The gear 165 is in mesh-engagement with a gear 168 through a pinion 167. The gear 168 is integrally formed with a lever 169 and rotation of the gear 168 causes rotation of the lever 169. Designated by 170 is a pivotable member supported for rotation about a shaft 170a and having a first projected portion 170b engageable with the tail end of the lever 169 and a second projected portion 170c engageable with the stepped portion 171c of a holding member 171. The pivotable member 170 is provided with a sector gear portion 170d which is in mesh-engagement with a gear portion 157 formed on the lens barrel 154. The holding member 171 is pivotable about the shaft 171a and the stepped portion 171c thereof is biased by a spring 172 into a position in which it is engageable with the second projected portion 170c of the pivotable member 170, and the bent portion 171b thereof may be forced to pivot about the shaft 171a by the end of a camera release roll 181 during the depression thereof, thereby releasing the retention of the projected portion 170 of the pivotable member 170 at that time. The release rod 181 may be depressed in the direction of arrow 173 against the force of a return spring 182 and is provided with a switch throwing piece 174 at a portion thereof. With the depression of the rod 181, the actuating switch 151 of the range finding module 152 is closed to actuate the range finding module 152. At a portion of the release rod 181, there is formed a click stop recess 181a into which the retaining portion of a click spring 175 may drop in a position wherein the actuating switch 151 is closed by the switch throwing piece 174 during the depression of the release rod. Designated by 176 is a shutter release member which may be pivoted about a shaft 177 by the end portion of the holding member 171 at the last end of the depression of the release rod 181, therby releasing an unshown shutter. Denoted by 178 is a finder field frame through which an unshown object to be focused may be aimed at. Reference numeral 179 denotes a finger optical system. Disposed at the upper portion of the finder optical frame 178 is the already described alarm display light-emitting diode LD so that alarm display representing the first stage or an incomplete range finding operation is effected within the finder in accordance with the alarm signal generated by the range finding module 152.

Description will now be made of the operation of the camera constructed as described above.

First, the film advance lever 162 is rotated in the direction of arrow 166 to effect photography, whereupon an unshown film advance and shutter charge mechanism is actuated to effect film advance and shutter charge, while the lever 169 is pivoted rightwardly from its shown position through the gear train 165-167-168, thereby urging the first projected portion 170b of the pivotable member 170 to pivot the pivotable member 170 clockwisely about the shaft 170a. By this, the lens barrel 154 is rotated counter-clockwisely about the optical axis of the picture-taking lens 153 through the mesh-engagement between the gear portion 170d of the pivotable member 170 and the gear portion 157, whereby the spring 158 is charged and the lens 153 is moved toward the infinity focus position. During the rotation of the film advance lever 162, when the pivotable member 170 is pivoted just to its shown position, the holding member 171 is pivoted counter-clockwise about the shaft 171a under the action of the spring 172 so that the stop stepped portion 171c thereof comes into below the second projected portion 170c of the pivotable member 170 to retrain the second projected portion 170c, whereby the pivotable member 170 and accordingly the lens barrel 154 is restrained and held in the shown position against the force of the spring 158 and at this time, the lens 153 becomes set to the infinity focus position.

Next, in this state, after the camera is aimed at a desired object within the picture-taking field defined by the field frame 178 by looking into the finger and when the release rod 181 is depressed to a position whereat it is click-stopped by the click spring 175, the switch 151 is closed by the switch throwing piece 174 and the range finding module 152 starts the same range finding operation as that described with respect to the circuit system shown in FIG. 7 and as described above, the light-emitting diode LD is turned on to effect the alarm display until the range finding is properly completed, but when the range finding is properly completed, the light-emitting diode LD is turned off to release the alarming state. When it has been found upon the turn-off of the light-emitting diode LD that the range finding has been properly completed, the release rod 181 may be further depressed from its click-stopped position, whereby the tip end thereof abuts against the bent portion 171b of the holding member 171, whereupon the holding member 171 is pivoted clockwisely against the force of the spring 172 and at this time, the retention of the pivotable member 170 by the stepped portion 171c is released and accordingly, the lens barrel 154 is rotated clockwisely by the action of the spring 158 to move the lens 153 toward the closest focus position. On the other hand, during such rotation of the lens barrel 154, the pulse generated by the sliding movement of the pulse generating conductive piece 155 relative to the contactor 160 is imparted to the picture-taking optical system adjust position information output circuit 45 of FIG. 7 in the module 152 and converted thereby into a signal representing the amount of movement of the lens 153, whereafter the signal is applied to the digital comparator 44. In the course of the movement of the lens 153, the comparison between the data regarding the amount of lens movement from the position information output circuit 45 and the distance data stored in the distance data storing latch circuit 88 is effected by the comparator 44 in the range finding module 152 and when the two are coincident, in other words, when the lens 153 reaches a distance position corresponding to the measured object distance, the "A=B" output of the comparator 44 becomes high and therefore, the output from the output terminal OT4 of the output control circuit 46 becomes high and accordingly, in the lens stop means 161, the movable piece 161a is attracted because the electromagnetic coil 161b is excited by the turn-on of the transistor Tr7, and the tip end portion of the movable piece 161a comes into engagement with the stop claw 156 of the lens barrel 154. Accordingly, at this point of time, the lens barrel 154 is stopped and in this condition, the lens 153 is properly focused to the object. Thereafter, if the release rod 181 is depressed to the last end of its stroke, the holding member 171 is further pivoted clockwisely, whereupon the release member 176 is actuated to release the shutter, not shown, and photography takes place with the lens 153 properly focused.

If the release rod 181 is released from its depressed condition after completion of the photography, the rod 181 is returned to its shown position by the action of the return spring 182 and when the switch 151 is opened at this time, the range finding module 152 stops its operation and the electromagnetic coil 161b in the stop means 161 is deenergized to release the engagement between the movable piece 161a and the stop claw 156 and thus, the lens barrel 154 is rotated clockwisely by the action of the spring 158 until the first projected portion 170b of the pivotable member 170 abuts against the lever 169.

Thereafter, if the film advance lever 162 is operated to effect film advance and shutter charge for the next cycle of photography, the reset of the lens 153 to its initial position, namely, to the infinity focus position, will take place in the manner as described above.

On the other hand, when a signal informing of an abnormal state is put out from the abnormal state detector circuit 41 during the object distance measurement by the range finding module 152, the projector means 17 is actuated to form a projection image 19 (see FIG. 6) of its projected light on the object and the range finding module 152 repeats its range finding operation in accordance with such projection image 19 on the object. If the range finding is properly effected thereby, the alarm display light-emitting diode LD is turned off at the termination of the range finding operation to release the alarming state. Accordingly, if the release rod 181 is depressed in this state, the setting of the picture-taking lens 153 to its focused position will take place in the manner as described above, thus enabling photography to be accomplished in the focused condition.

Where there is still a warning that the range finding is incomplete even if the projector means 17 has been actuated, improper photography will take place and in such a case, as already described, the electromagnetic coil 161b is excited by the signal from the output terminal OT4 of the output control circuit 46 in the range finding module 152, so that the lens 153 is locked to its initial position, namely, the infinity focus position and therefore, even in such state, if the release rod 181 is depressed, it will be practically possible to photograph an object with a substantially allowable degree of clearness, as already described.

Thus, in an automatic focusing camera utilizing the range finding device of the present invention, reliable and highly accurate focus detection is possible even under various object conditions.

As has hitherto been described in detail, the present invention, as a device which photoelectrically effects the detection of the focused point of the optical system to a target or the distance to such target, detects when the detection is incomplete and forms on the target a projection image of the projected light from projector means or in other words, forms an artificial mark on the target, by automatically actuating the projector means provided so as to illuminate a limited part of the detection filed of the device, and utilizes such artificial mark to effect the focused point detection or the distance detection. According to this invention, proper detecting operation may be sufficiently ensured not only in the dark place but also in the case where the target is of very low brightness or of very low contrast. In addition, the projector means which illuminates only a samll part of the detection field requires a very slight quantity of electric power. Thus, the present invention will be highly advantageous when adopted by such kind of devices. Also, the present invention has been described with respect to an application thereof to a so-called range finder type distance measuring device, whereas the invention is not restricted to the construction of the illustrated embodiment, but it is equally applicable to a case where an area type self-scanning image sensor is used to detect the degree of clearness of an object image to thereby effect the focus detection. Again in such case, the detecting capability may be greatly enhanced by using the projector means for an object of low brightness or very low contrast. Further, the present invention is applicable to a distance detecting device or focus detecting device using an ordinary photodiode to obtain the same result as that described above.

We claim:

1. A system comprising:
   (A) means for forming one or more images of an object;
   (B) means for receiving said one or more images to provide one or more electrical outputs indicative of said one or more images, said image receiving means being signal integration type image sensing means for providing, as the outputs thereof, one or more integrated image signal integrated within an integration time period;
   (C) means for receiving and processing said one or more electrical outputs of said image receiving means to detect the imaging condition of said one or more images formed by said image forming means;
   (D) means for locally illuminating said object to form an optical mark on said object;
   (E) means for detecting whether or not said one or more electrical outputs of said image receiving means are sufficiently proper outputs to ensure accurate imaging condition detection by said processing means, said detection means producing a detection signal when said one or more electrical outputs of the image receiving means are outputs which cannot ensure accurate imaging condition detection by the processing means;
   (F) said system further comprising means for controlling the integration time period of said image sensing means, said control means producing a control signal indicative of the integration time period of the sensing means;
   (G) means responsive to said detection signal produced by said detection means to actuate said illuminating means, said actuating means being responsive to said control signal produced by said control means to actuate said illuminating means for a time period corresponding to the integration time period of said image sensing means in accordance with said control signal and said detection signal produced by said detection means.

2. The system according to claim 1, wherein
said image forming means is arranged to form first and second images of the object with a relative positional difference corresponding to the distance to the object;
said image receiving means is arranged to receive said first and second images to provide, as the outputs thereof, image element signal on each image element of the first and second images;
said processing means includes;
   quantization means for quantizing the image element signal generated for each image element by said image sensing means; and
   circuit means to receive quantized data from said quantization means and detect, on the basis of said quantized data, the relative positional difference between M successive image elements of the first image and M successive image elements of the second image corresponding to the M successive image elements of the first image so as to provide for data regarding to the range of the object;
said detection means includes:
   quantization state detection means for detecting whether or not among quantized data from said quantization means, all of the quantized data regarding at least said M successive image elements of the first image are one and the same value, said quantization state detection means producing a detection signal when all of the quantized data regarding at least the M successive image elements of the first image are one and the same value; and
said actuating means is reponsive to said detection signal produced by said quantization state detection means to actuate said illuminating means in accordance with said detection signal.

3. The system according to claim 2, wherein said quantization means converts the image element signal generated for each image element by said image sensing means into binary data of "1" or "0", on the basis of a predetermined threshold level, and said quantization state detection means detects whether or not all of the binary data at least on said M successive image elements of the first image among binary data from said quantization means are "1" or "0" and produces said detection signal when it detects that all of the binary data at least on the M successive image elements of the first image are "1" or "0".

4. The system according to claim 2 or 3, wherein
said circuit means in said processing means includes:
   a detection circuit for detecting, within the second image, one set of M successive image elements corresponding to the M successive image elements of the first image by the successive comparison of the quantized data on the M successive image elements of the first image with the quantized data on each of different sets of M successive image elements of the second image; and
said detection means further includes:
   means for evaluating, on the basis of the quantized data, the degree of similarity to the M successive image elements of the first image of said one set of M successive image elements of the second image which has been deemed to correspond with the M successive image elements of the first means by said detection circuit, said evaluating means compares said degree of similarity with a predetermined constant degree and produces a detection signal when the degree of similarity is lower than said predetermined constant degree; and
said actuating means is also responsive to the detection signal produced by said evaluating means to actuate said illuminating means in accordance with at least one of said detection signal produced by said evaluating means and said detection signal produced by said quantization state detection means.

5. The system according to claim 4, wherein said detection circuit in said circuit means includes:

a coincidence detection circuit for detecting, on element by element basis, the coincidence of the quantized data on the M successive image elements of the first image with the quantized data on each set of M successive image elements of the second image;

a counter circuit for obtaining, on the basis of the quantized data, the degree of similarity of each set of the M successive image elements of the second image to the M successive image elements of the first image by counting the coincidence output of said coincidence detecting circuit; and a memorizing circuit for memorizing the maximum value of the counted value of said counter circuit;

said evaluating means evaluates the degree of similarity by comparing said maximum value of the counted value memorized in said memorizing circuit with a predetermined constant value and produces said detection signal when said maximum value is below said predetermined constant value.

6. The system according to claim 1, wherein said image forming means is arranged to form first and second images of the object with a relative positional difference corresponding to the distance to the object;

said image receiving means is arranged to receive said first and second images to provide, as the outputs thereof, image element signal on each image element of the first and second images;

said processing means includes;

quantization means for quantizing the image element signal generated for each image element by said image sensing means; and circuit means to receive quantized data from said quantization means and detect, on the basis of said quantized data, the relative positional difference between M successive image elements of the first image and M successive image elements of the second image corresponding to the M successive image elements of the first image so as to provide with data regarding the range of the object, said circuit means having detection circuit for detecting, within the second image, one set of M successive image elements corresponding to the M successive image elements of the first image by the successive comparison of the quantized data on the M successive image elements of the first image with the quantized data on each of different sets of M successive image elements of the second image; and said detection means includes:

means for evaluating, on the basis of the quantized data, the degree of similarity to the M successive image elements of the first image of said one set of M successive image elements of the second image which has been deemed to correspond with the M successive image elements of the first means by said detection circuit, said evaluating means compares said degree of similarity with a predetermined constant degree and produces a detection signal when the degree of similarity is below said predetermined constant degree; and said actuating means is responsive to the detection signal produced by said evaluating means to actuate said illuminating means in accordance with said detection signal produced by said evaluating means.

7. The system according to claim 6, wherein said detection circuit in said circuit means includes:

a coincidence detection circuit for detecting, on element by element basis, the coincidence of the quantized data on the m successive image elements of the first image with the quantized data on each set of M successive image elements of the second image;

a counter circuit for obtaining, on the basis of the quantized data, the degree of similarity of each set of the M successive image elements of the second image to the M successive image elements of the first image by counting the coicidence output of said coincidence detecting circuit; and a memorizing circuit for memorizing the maximum value of the counted value of said counter circuit;

said evaluating means evaluates the degree of similarity by comparing said maximum value of the counted value memorized in said memorizing circuit with a predetermined constant value and produces said detection signal when said maximum value is below said predetermined constant value.

8. The system according to claim 2 wherein, said image receiving means is signal integration type image sensing means for providing, as the outputs thereof, integrated image element signals integrated within an integration time period;

said system further comprises means for controlling the integration time period of said image sensing means, said control means producing a control signal indicative of the integration time period of the sensing means; and said actuating means is responsive to said control signal produced by said control means to actuate said illuminating means for a time period corresponding to the integration time period of said image sensing means in accordance with said control signal and said detection signal produced by said detection means.

9. A range detecting device for detecting the range of an object, comprising:

(A) image sensing means positioned to receive first and second detection images of said object and to provide an image element signal on each image element of the first and second detection images;

(B) quantization means for quantizing the image element signal generated for each image element by said image sensing means;

(C) circuit means to receive quantized data from said quantization means and detect, on the basis of said quantized data, the relative positional difference between M successive image elements of the first detection image and M successive image elements of the second detection image corresponding to the M successive image elements of the first detection image so as to provide for data regarding the range of the object;

(D) quantization state detection means for detecting whether or not among quantized data from said quantization means, all of the quantized data regarding at least said M successive image elements of the first detection image are one and the same value, said quantization state detection means producing a detection signal when it detects that all of the quantized data at least on the M successive image elements of the first detection image are one and the same value;

(E) illuminating means for locally illuminating said object to form an optical mark on said object; and (F) actuating means responsive to said detection signal produced by said quantization state detection means to actuate said illuminating means.

10. The device according to claim 9, wherein said quantization means converts the image element signal generated for each image element by said image sensing means into binary data of "1" or "0", on the basis of a predetermined threshold level, and said quantization state detection means detects whether or not all of the binary data at least on said M successive image elements of the first image among binary data from said quantization means are "1" or "0" and produces said detection signal when it detects that all of the binary data at least on the M successive image elements of the first image are "1" or "0".

11. The device according to claim 9 or 10, wherein said image sensing means is signal integration type image sensing means providing integrated image element signals integrated within an integration time period;

said device further comprises:

means for controlling the integration time period of said image sensing means, said control means producing a control signal indicative of the integration time period of the sensing means; and said actuating means is responsive to said control signal produced by said control means to actuate said illuminating means for a time period corresponding to the integration time period of said image sensing means in accordance with said control signal and said detection signal produced by said quantization state detection means.

12. A range detecting device for detecting the range of an object, comprising:

(A) image sensing means positioned to receive first and second detection images of said object and to provide an image element signal on each image element of the first and second detection images;

(B) quantization means for quantizing the image element signal generated for each image element by said image sensing means;

(C) circuit means to receive quantized data from said quantization means and detect, on the basis of said quantized data, the relative positional difference between M successive image elements of the first detection image and M successive image elements of the second detection image corresponding to the M successive image elements of the first detection image so as to provide for data regarding the range of the object, the circuit means including detection means for detecting, within the second detection image, one set of M successive image elements corresponding to the M successive image elements of the first detection image by the successive comparison of the quantized data on the M successive image elements of the first detection image with the quantized data on each of different sets of M successive image elements of the second detection image;

(D) means for evaluating on the basis of the quantized data, the degree of similarlity to the M successive image elements of the first detection image of said one set of M successive image elements of the second detection image which has been deemed to correspond with the M successive image elements of the first detection means by said detection means, said evaluating means comparing said degree of similarity with a predetermined constant degree and producing a detection signal when the degree of similarity is lower than said predetermined constant degree;

(E) illuminating means for locally illuminating said object to form an optical mark on said object; and (F) actuating means responsive to said detection signal produced by said evaluating means to actuate said illuminating means.

13. The device according to claim 12, wherein said detection means includes a coincidence detection circuit for detecting, on element by element basis, the coicidence of the quantized data on the M successive image elements of the first image with the quantized data on each set of M successive image elements of the second image;

a counter circuit for obtaining, on the basis of the quantized data, the degree of similarity of each set of the M successive image elements of the second image to the M successive image elements of the first image by counting the coincidence output of said coincidence detecting circuit; and a memorizing circuit for memorizing maximum value of the counted value of said counter circuit;

said evaluating means evaluates the degree of similarity by comparing said maximum value of the counted value memorized in said memorizing circuit with a predetermined constant value and produces said detection signal when said maximum value is below said predetermined constant value.

14. The device according to claim 12 or 13, wherein said image sensing means is signal intergration type sensing means providing integrated image element signals integrated within an integration time period;

said device further comprises:

means for controlling the integration time period of said image sensing means, said control means producting a control signal indicative of the integration time period of the sensing means; and said actuating means is responsive to said control signal produced by said control means to actuate said illuminating means for a time period corresponding to the integration time period of said image sensing means in accordance with said control signal and said detection signal produced by said evaluating means.

* * * * *

UNITED STATES PATENT AND TRADEMARK OFFICE
CERTIFICATE OF CORRECTION

PATENT NO. : 4,257,705

DATED : March 24, 1981

INVENTOR(S) : HOSOE ET AL.

It is certified that error appears in the above—identified patent and that said Letters Patent is hereby corrected as shown below:

Column 3, line 63, "date" should read --data--.

Column 6, line 9 "shemas" should read --schema--.

Column 7, line 27, "it" should read --if--.

Column 8, line 63, "in" should read --is--.

Column 10, line 39, "chefly" should read --chiefly--.

Column 12, line 48, "nxt" should read --next--.

Column 13, line 64, "on" should read --in--.

Column 15, line 37, after "reliable", insert --and--.

Column 17, line 31, "3448.5)" should read --348.5).--; line 42, "29" should read --20--.

UNITED STATES PATENT AND TRADEMARK OFFICE
CERTIFICATE OF CORRECTION

PATENT NO. : 4,257,705
DATED : March 24, 1981
INVENTOR(S) : HOSOE ET AL.

It is certified that error appears in the above—identified patent and that said Letters Patent is hereby corrected as shown below:

Column 18, line 7, after "and", insert --gate--; line 25, "flip flops" should read --flip-flop--.

Column 21, line 3, after "the" insert --$Q$--.

Column 23, line 58, "transistor" should read --transistors--.

Column 24, line 29, "situated" should read --similar--.

Column 25, line 23, "monoconductive" should read --nonconductive--.

Column 26, line 30, "roll" should read --rod--; line 47, "therby" should read --thereby--.

Column 27, line 20, "finger" should read --finder--.

Column 29, line 2, "inaddition" should read --in addition--; line 3, "samll" should read --small--; line 7, "divices" should read --devices--.

UNITED STATES PATENT AND TRADEMARK OFFICE
CERTIFICATE OF CORRECTION

PATENT NO. : 4,257,705
DATED : March 24, 1981
INVENTOR(S) : HOSOE ET AL.

It is certified that error appears in the above—identified patent and that said Letters Patent is hereby corrected as shown below:

Column 29, line 30, "signal" should read --signals--.

Column 30, line 14, after "regarding", delete "to".

Column 32, line 5, "m" (first occurrence) should read --M--.

Column 34, line 23, "coicidence" should read --coincidence--;

line 47, "producting" should read --producing--.

Signed and Sealed this

Eighth Day of September 1981

[SEAL]

Attest:

Attesting Officer

GERALD J. MOSSINGHOFF

Commissioner of Patents and Trademarks